(12) United States Patent
Melnyczuk

(10) Patent No.: US 9,510,605 B2
(45) Date of Patent: Dec. 6, 2016

(54) METHOD AND APPARATUS FOR THE PREPARATION OF A CRISP FOOD PRODUCT

(71) Applicant: Tania Maria Melnyczuk, Stellenbosch (ZA)

(72) Inventor: Michaelo Peter Melnyczuk, Stellenbosch (ZA)

(*) Notice: Subject to any disclaimer, the term of this patent is extended or adjusted under 35 U.S.C. 154(b) by 1 day.

(21) Appl. No.: 14/367,753

(22) PCT Filed: Dec. 21, 2012

(86) PCT No.: PCT/IB2012/057634
§ 371 (c)(1),
(2) Date: Jun. 20, 2014

(87) PCT Pub. No.: WO2013/093886
PCT Pub. Date: Jun. 27, 2013

(65) Prior Publication Data
US 2014/0356496 A1  Dec. 4, 2014

(30) Foreign Application Priority Data

Dec. 22, 2011  (ZA) .................................. 2011/09473

(51) Int. Cl.
*A23B 7/06*   (2006.01)
*A23B 7/02*   (2006.01)
(Continued)

(52) U.S. Cl.
CPC .............. *A23B 7/06* (2013.01); *A23B 7/0053* (2013.01); *A23B 7/0205* (2013.01);
(Continued)

(58) Field of Classification Search
CPC ... A23B 4/005–4/0053; A23B 7/005–7/0053; A23B 7/02–7/03; A23B 7/06; A47J 37/1214; A23L 1/0107–1/0114; A23L 1/0135; A23L 1/214–1/2175; A23L 3/50; A23L 1/0121; A23L 1/0128; A23L 1/1645; A23L 1/2123; A23L 3/185; A23L 3/40
USPC .................... 426/438–441, 520; 99/403–418
See application file for complete search history.

(56) References Cited

U.S. PATENT DOCUMENTS 1,649,488 A * 11/1927 Robinson ............. A23B 7/0215
 34/131
1,922,035 A *  8/1933 Goodman ................ A21B 5/08
 99/354

(Continued)

FOREIGN PATENT DOCUMENTS

CN  101485476  7/2009
CN  102125258  7/2011
(Continued)

OTHER PUBLICATIONS

International Search Report issued for International Application No. PCT/IB2012/057634, dated May 29, 2013.
(Continued)

*Primary Examiner* — Drew Becker
(74) *Attorney, Agent, or Firm* — Pillsbury Winthrop Shaw Pittman LLP

(57) ABSTRACT

A crisp food product is prepared in a first phase from thin food pieces of raw fruit, vegetable or gelatinizable proteins, by blanching them (if necessary) and drying them. A second phase takes place in a vacuum chamber, where the dried thin food pieces are exposed to heat to expand them, are quickly removed from the heat source and are cooled, before being removed from the vacuum.

28 Claims, 34 Drawing Sheets

(51) Int. Cl.

| | | |
|---|---|---|
| A23B 7/005 | (2006.01) | |
| A23L 3/18 | (2006.01) | |
| A23L 1/217 | (2006.01) | |
| A23B 7/03 | (2006.01) | |
| A23L 3/40 | (2006.01) | |
| A23L 1/01 | (2006.01) | |
| A23L 1/164 | (2006.01) | |
| A23L 1/212 | (2006.01) | |
| A47J 37/12 | (2006.01) | |

(52) U.S. Cl.
CPC .............. *A23B 7/0215* (2013.01); *A23B 7/03* (2013.01); *A23L 1/0107* (2013.01); *A23L 1/0121* (2013.01); *A23L 1/0128* (2013.01); *A23L 1/0135* (2013.01); *A23L 1/1645* (2013.01); *A23L 1/217* (2013.01); *A23L 1/2123* (2013.01); *A23L 3/185* (2013.01); *A23L 3/40* (2013.01); *A47J 37/1214* (2013.01)

(56) References Cited

U.S. PATENT DOCUMENTS

| | | | | |
|---|---|---|---|---|
| 2,018,419 | A * | 10/1935 | Richeson | A47J 37/1214 34/183 |
| 2,196,353 | A * | 4/1940 | Galban Y Carlo | A47J 37/1214 99/355 |
| 2,299,080 | A * | 10/1942 | De Back | A23B 7/06 134/10 |
| 2,522,513 | A * | 9/1950 | Hemmeter | A23B 7/06 99/443 C |
| 2,860,569 | A * | 11/1958 | Pitman | A47J 37/1214 198/523 |
| 2,948,620 | A * | 8/1960 | Ashley | A23B 7/06 426/311 |
| 3,794,500 | A * | 2/1974 | Lazaar et al. | A23L 3/185 426/511 |
| 3,826,184 | A * | 7/1974 | Shotton, Jr. | A47J 37/1214 99/404 |
| 3,962,355 | A * | 6/1976 | Yamazaki | A23B 7/0205 426/458 |
| 4,059,046 | A * | 11/1977 | Yamazaki | A47J 37/1214 198/952 |
| 4,320,699 | A * | 3/1982 | Binks | A47J 36/022 126/390.1 |
| 4,585,660 | A * | 4/1986 | Sugisawa | A23L 1/0107 426/438 |
| 4,844,931 | A * | 7/1989 | Webb | A23B 7/0205 426/438 |
| 4,989,346 | A * | 2/1991 | Wilken | F26B 17/04 34/203 |
| 5,073,400 | A * | 12/1991 | Bruno | A23L 1/2123 426/321 |
| 5,125,781 | A | 6/1992 | Breunig et al. | |
| 5,182,982 | A * | 2/1993 | Hattori | A47J 37/1214 99/355 |
| 5,263,406 | A * | 11/1993 | Chiu | A47J 27/0817 210/167.28 |
| 5,275,093 | A * | 1/1994 | Chiu | A23L 1/0107 210/167.28 |
| 5,676,042 | A * | 10/1997 | Sakuma | A23L 1/0107 99/330 |
| 6,001,411 | A * | 12/1999 | Kester | A23L 1/22628 426/321 |
| 2012/0052169 | A1* | 3/2012 | Janakat | A23L 1/0107 426/242 |

FOREIGN PATENT DOCUMENTS

| | | |
|---|---|---|
| EP | 0 409 643 | 1/1991 |
| JP | S62-262954 | 11/1987 |
| WO | WO 01/91580 | 12/2001 |

OTHER PUBLICATIONS

International Preliminary Report on Patentability issued for International Application No. PCT/IB2012/057634, dated May 9, 2014.

* cited by examiner

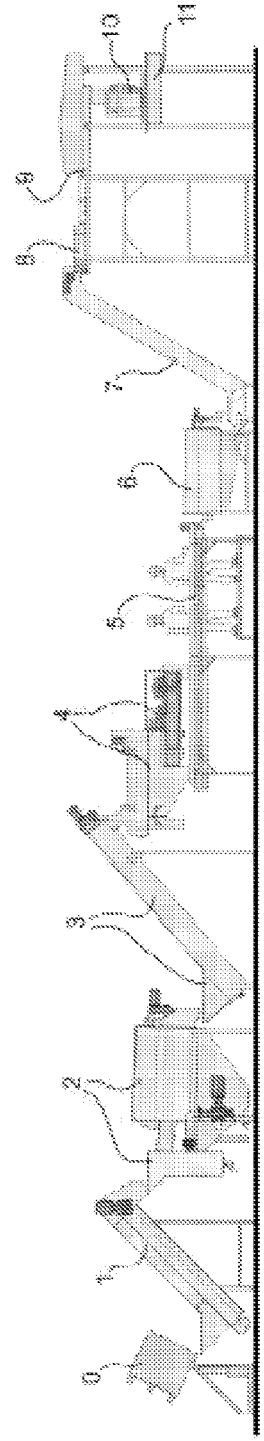
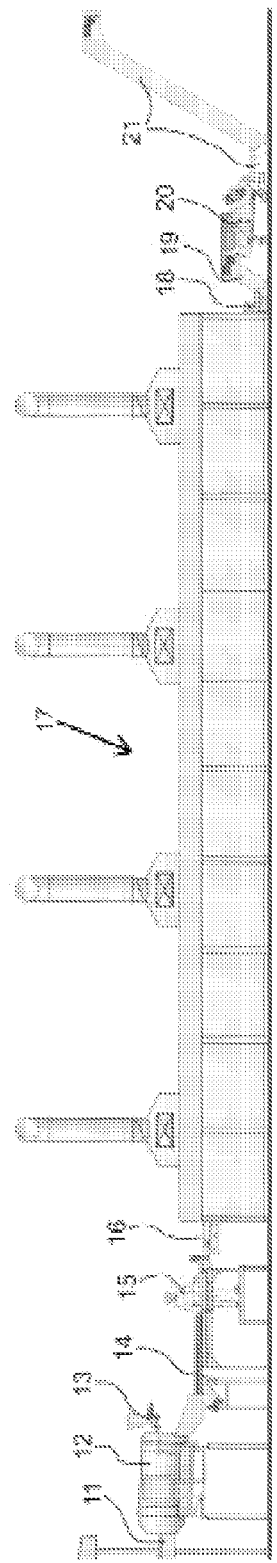
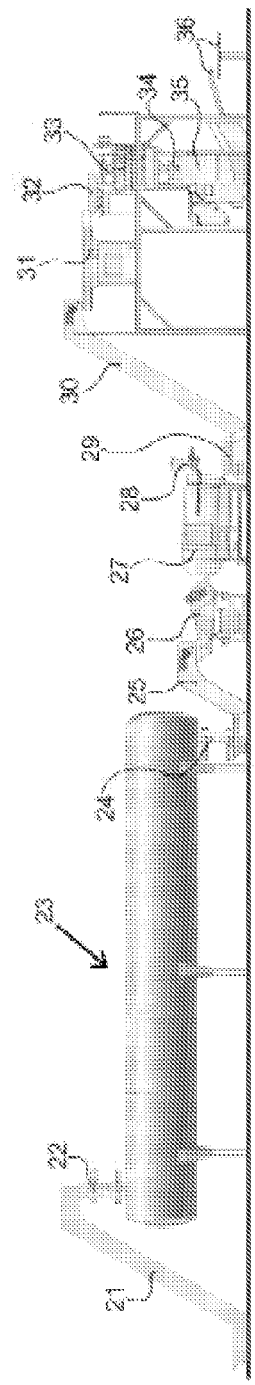
Fig. 1

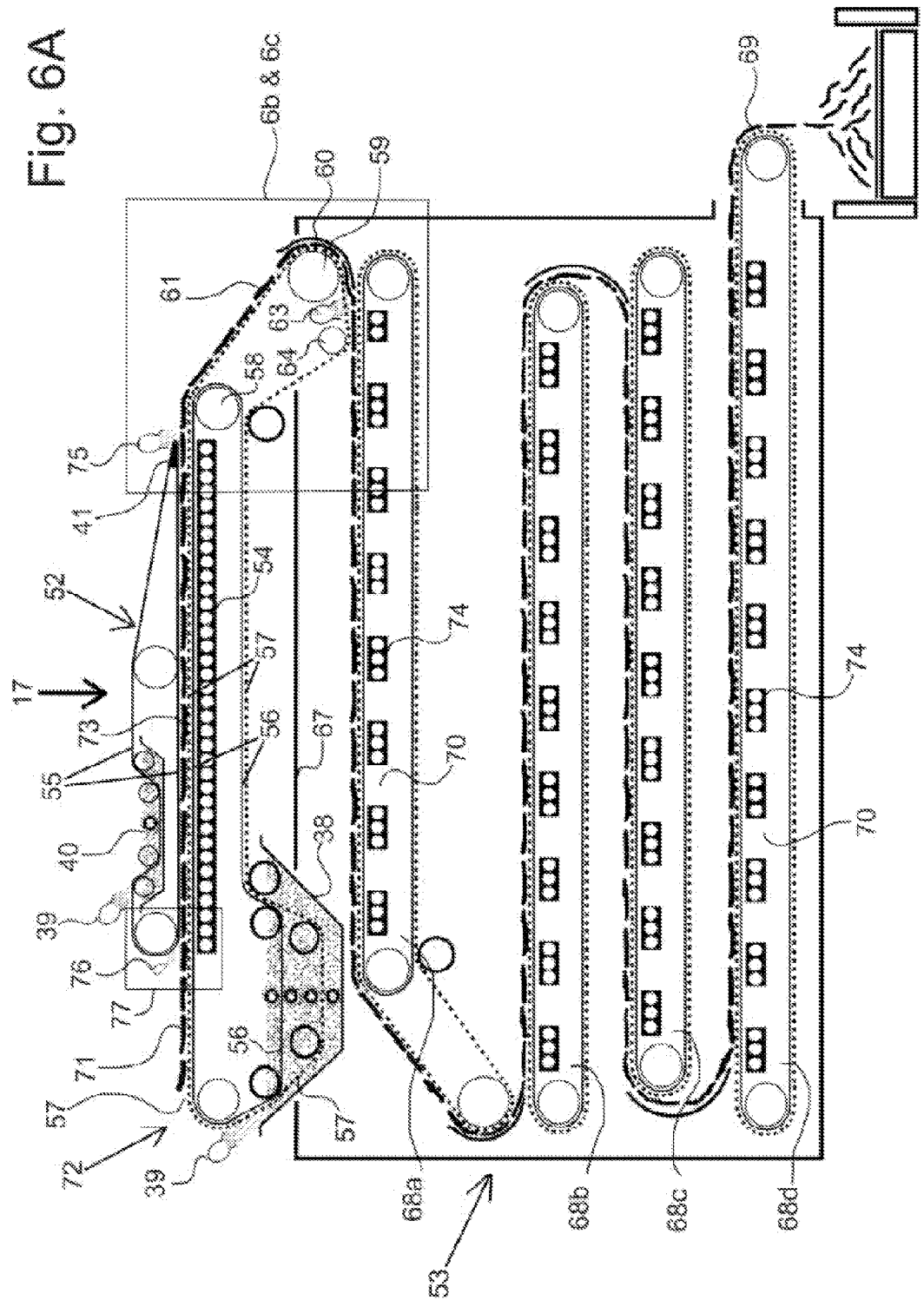

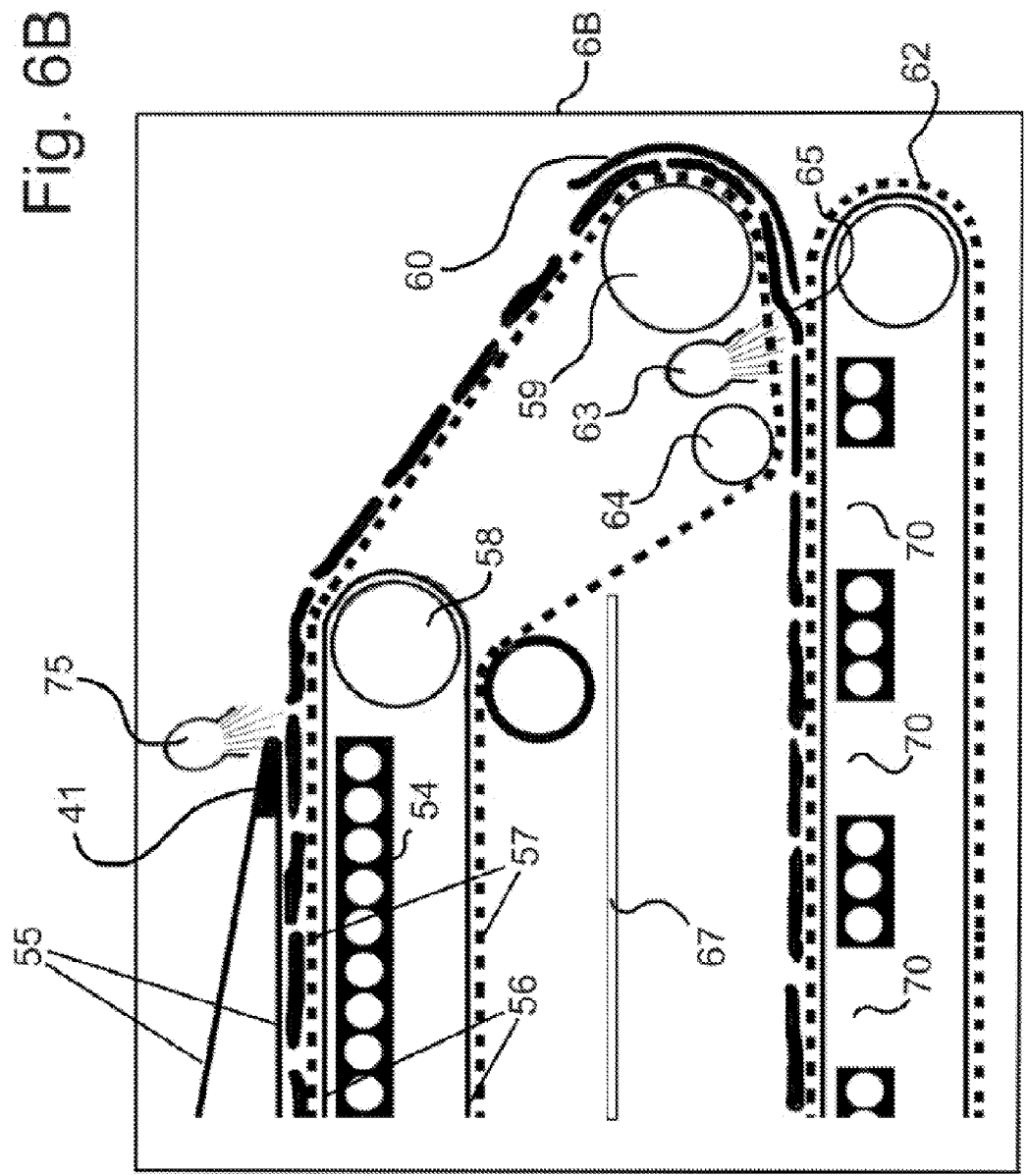

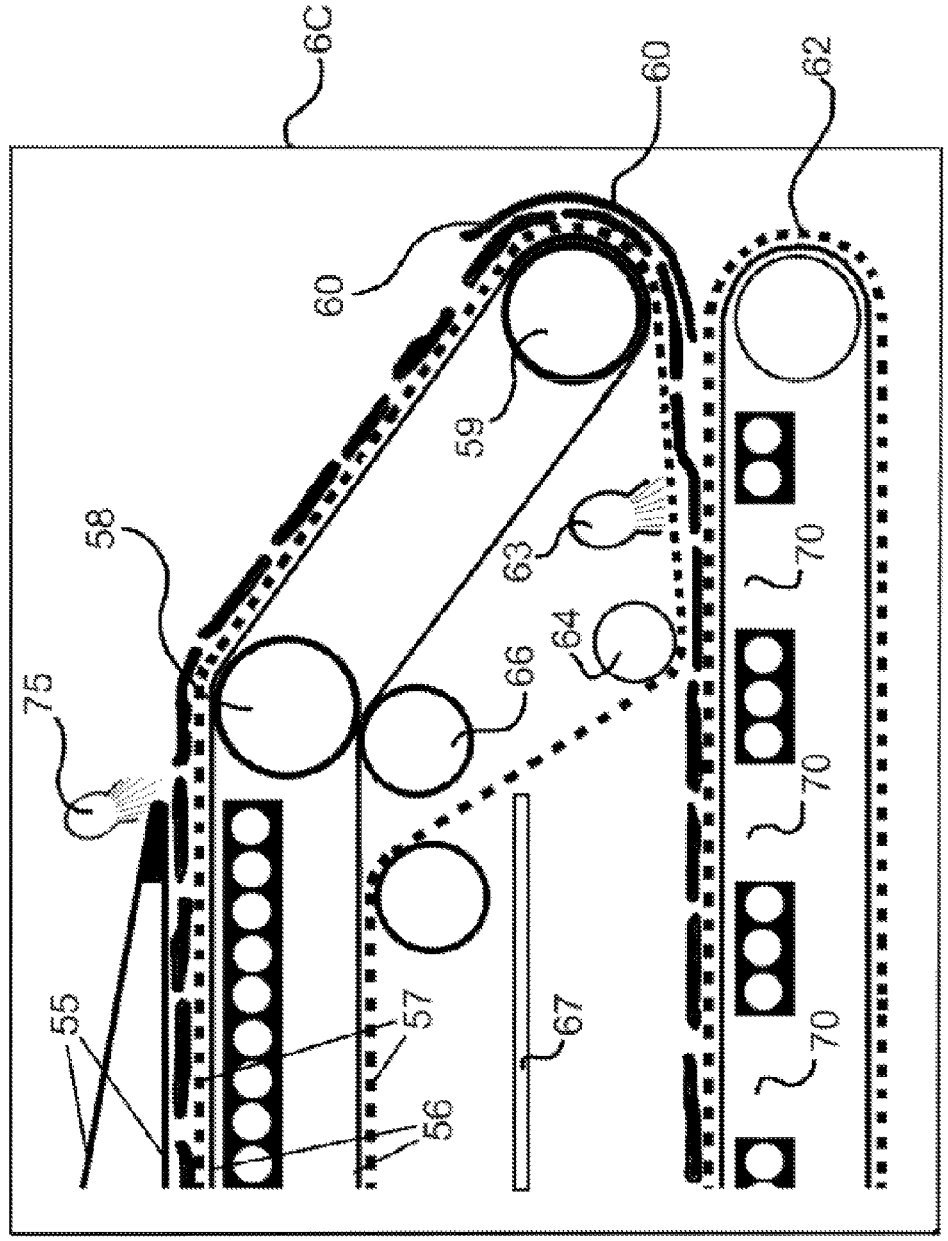

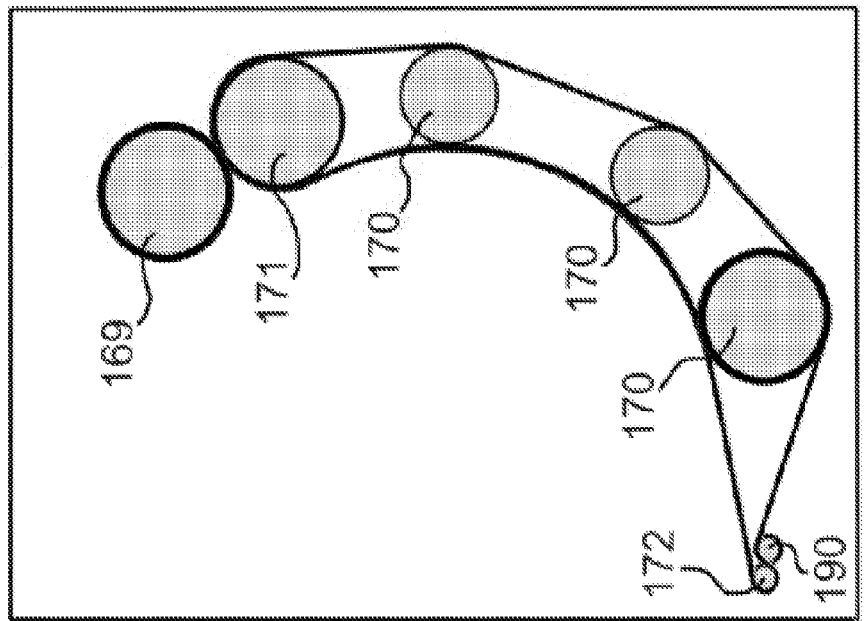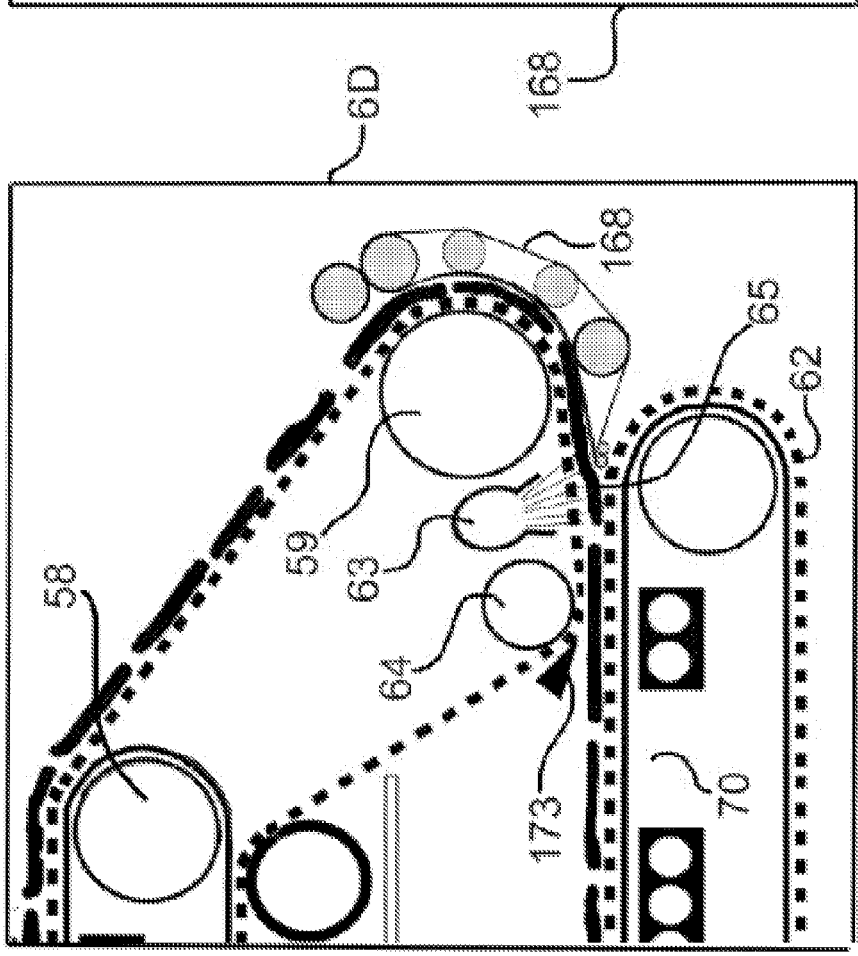

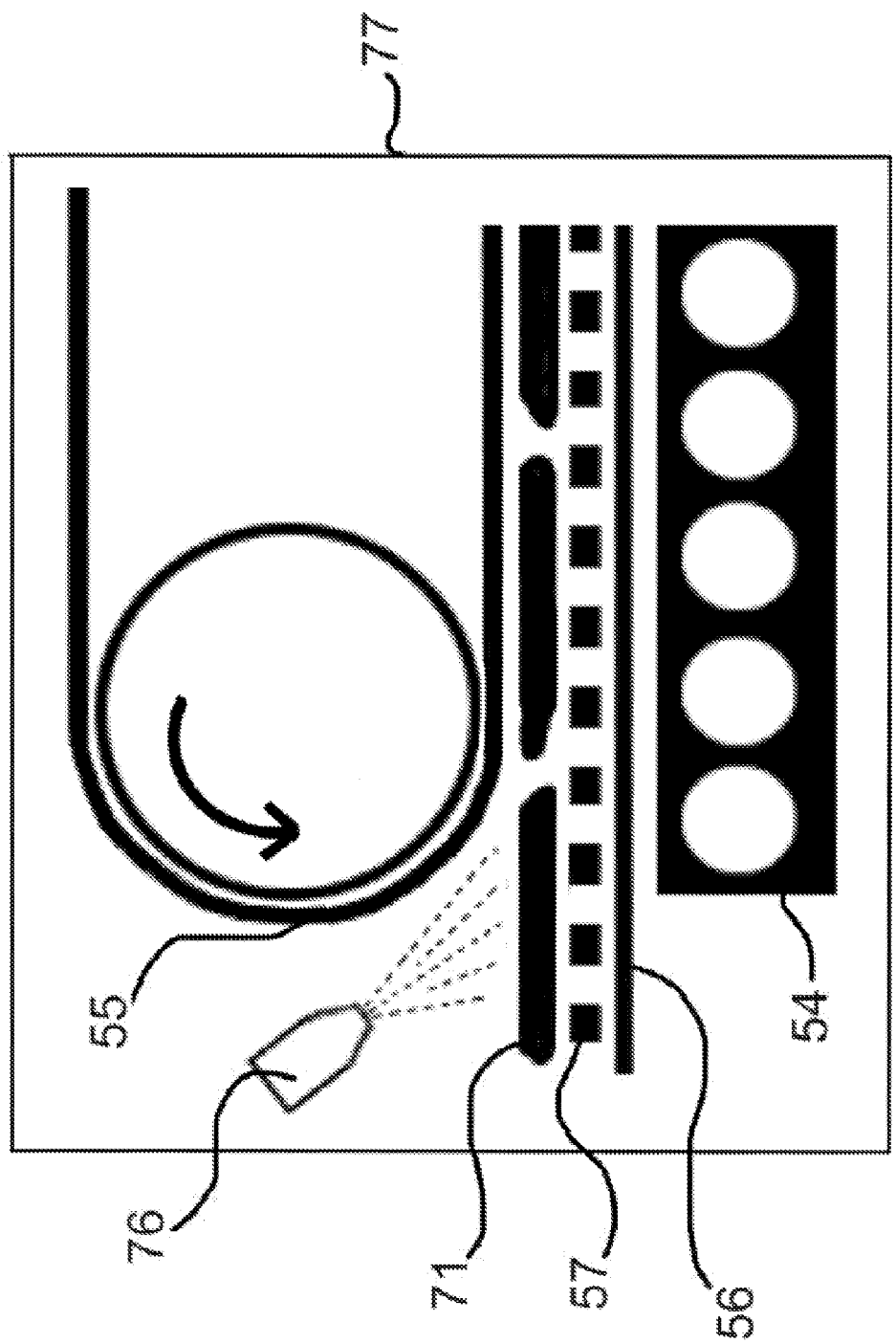

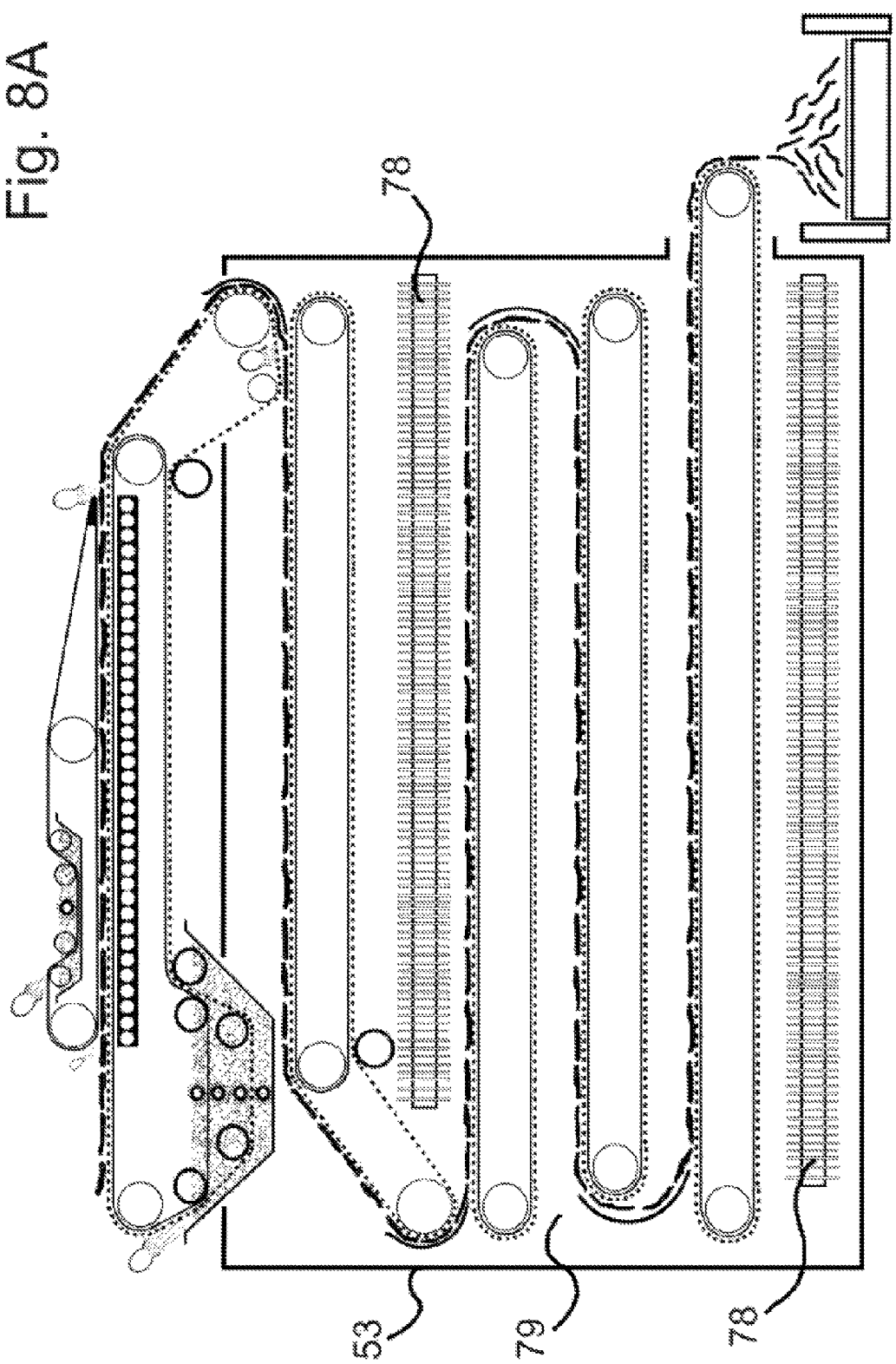

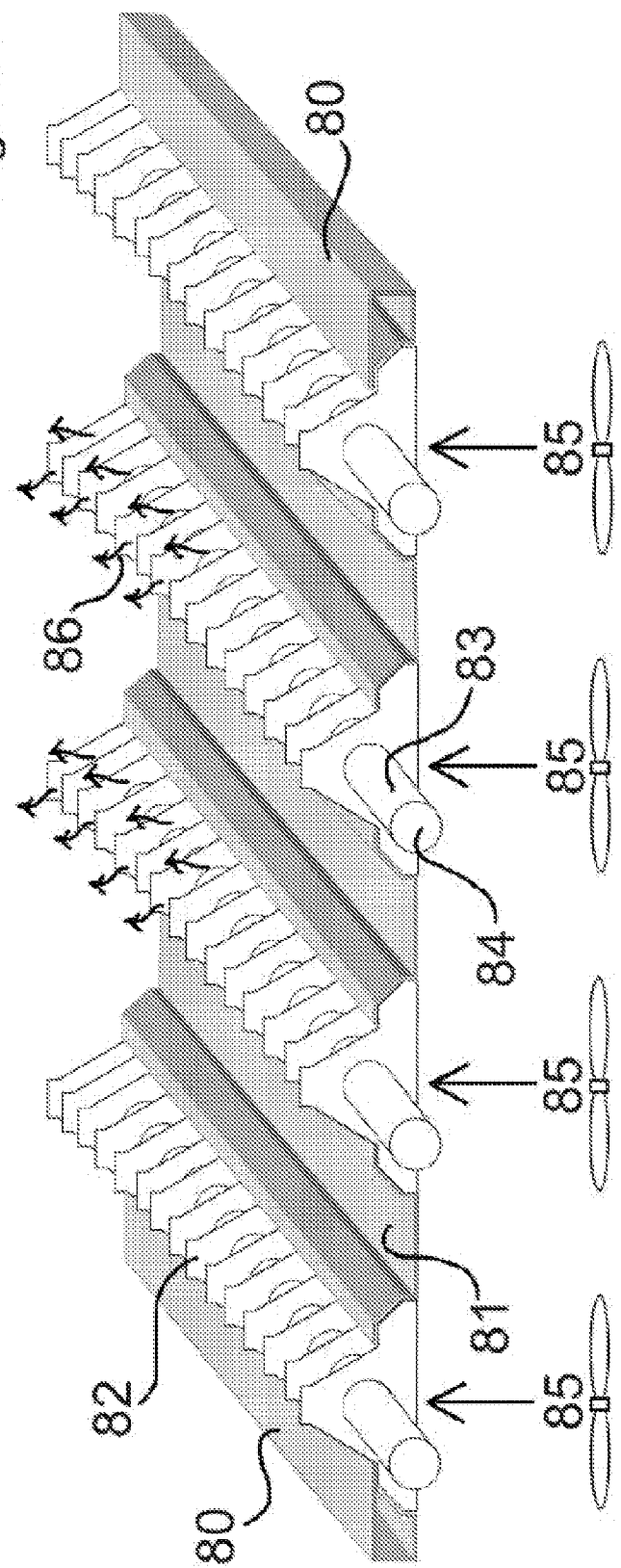

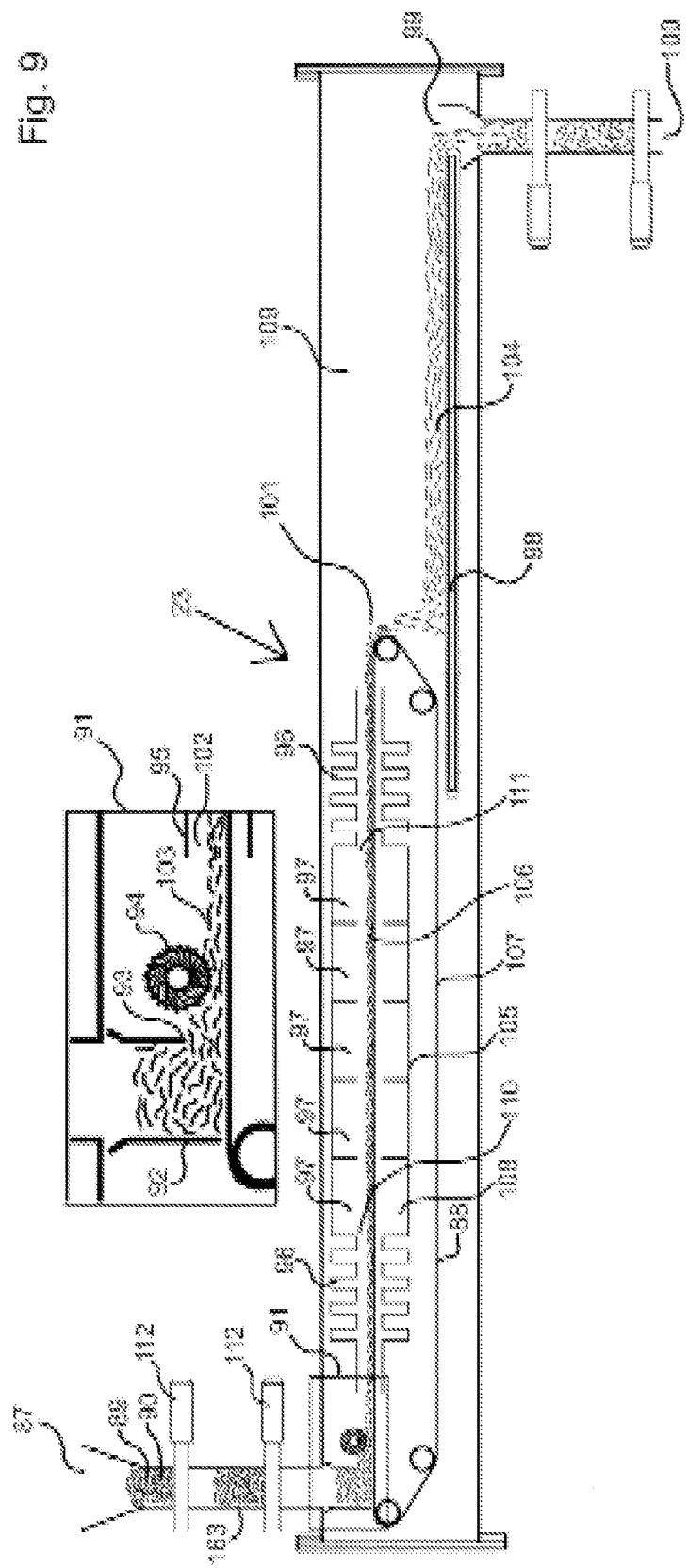

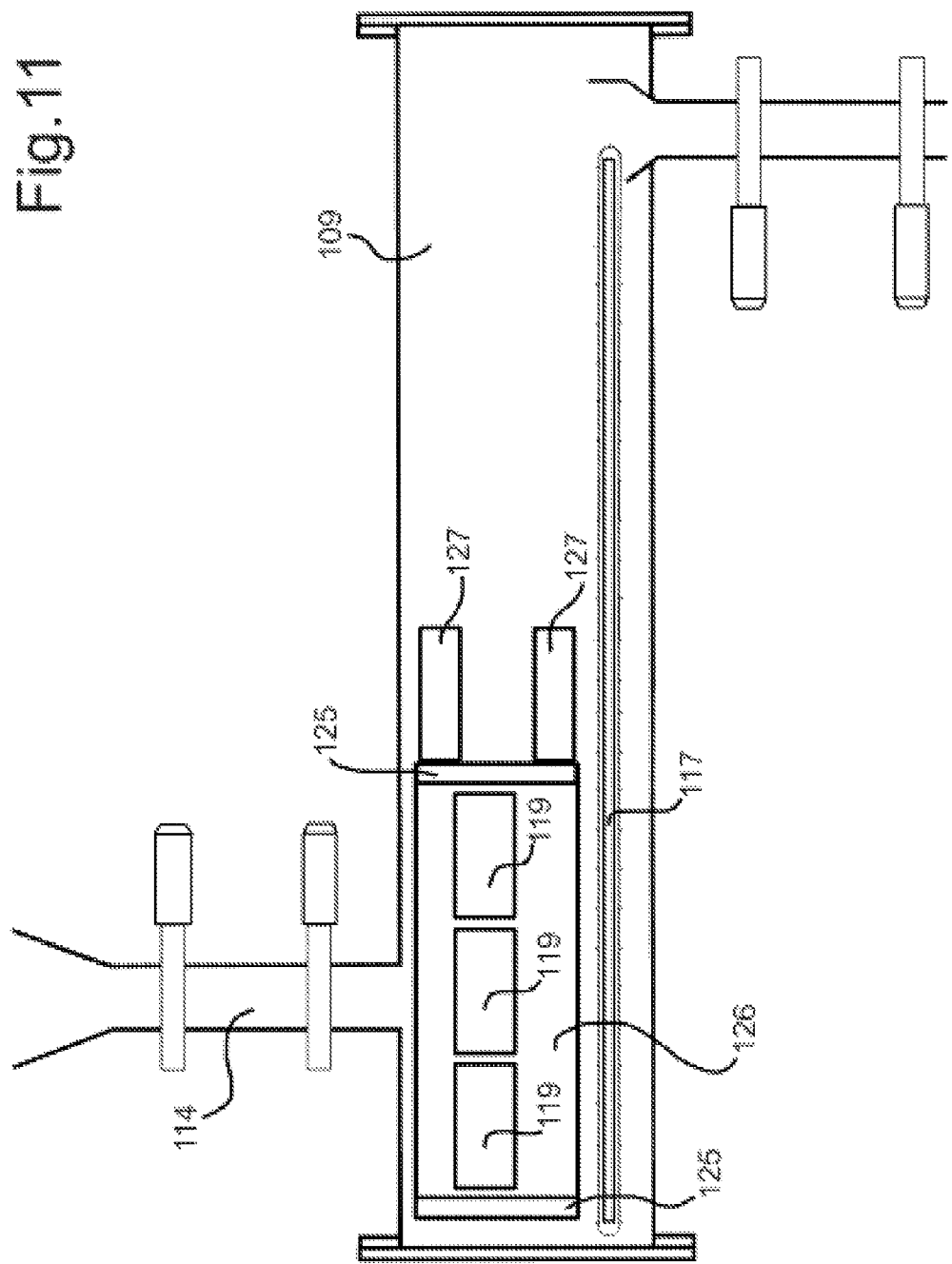

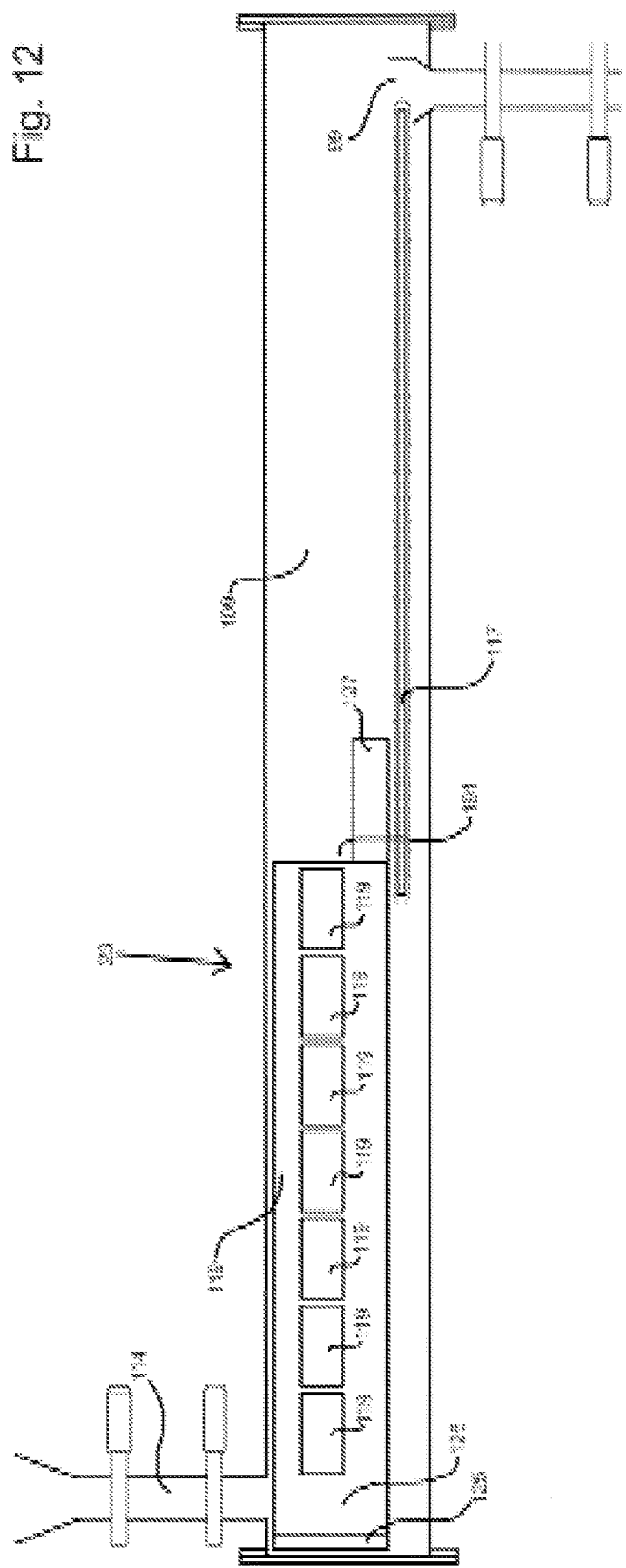

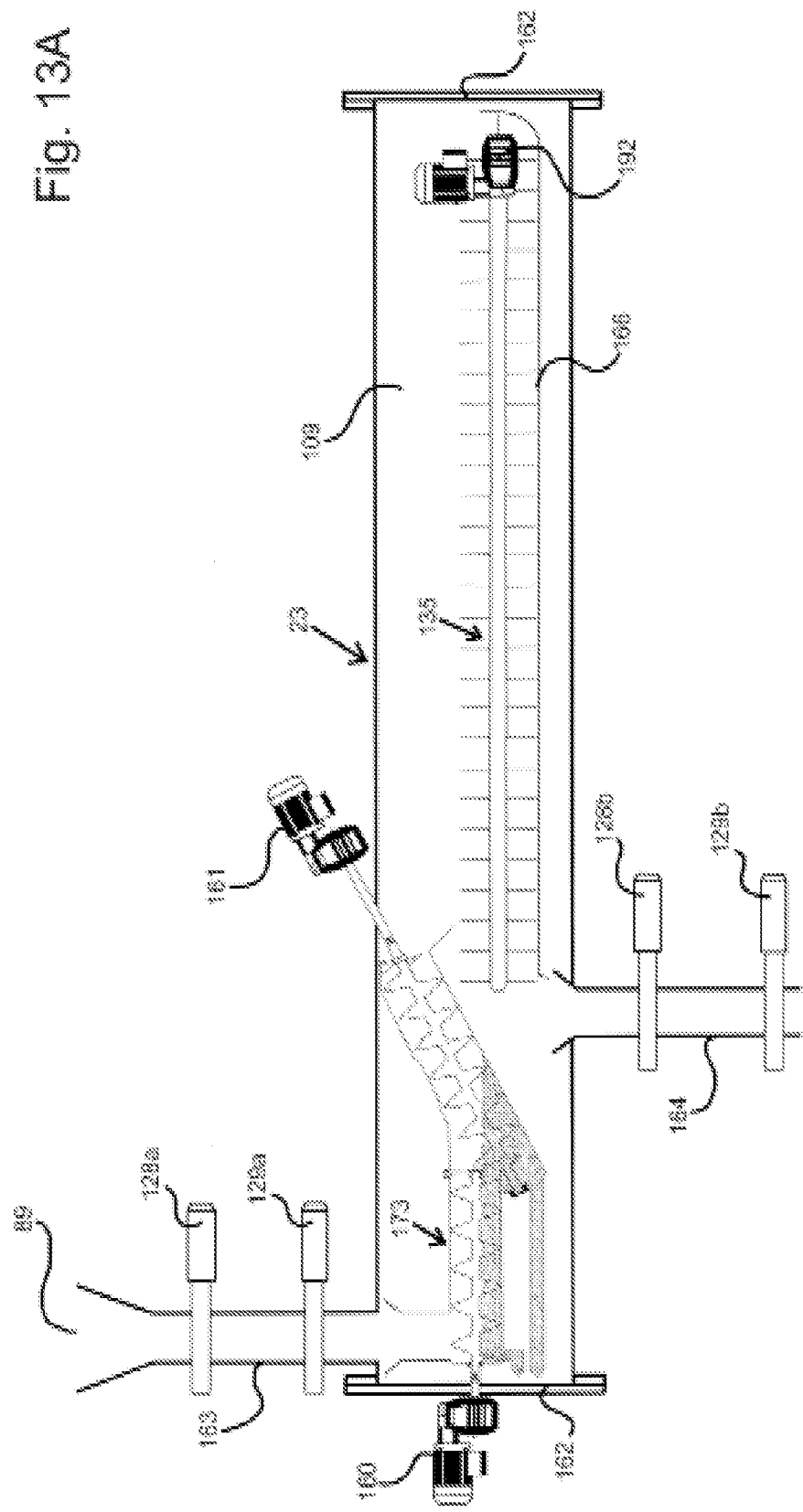

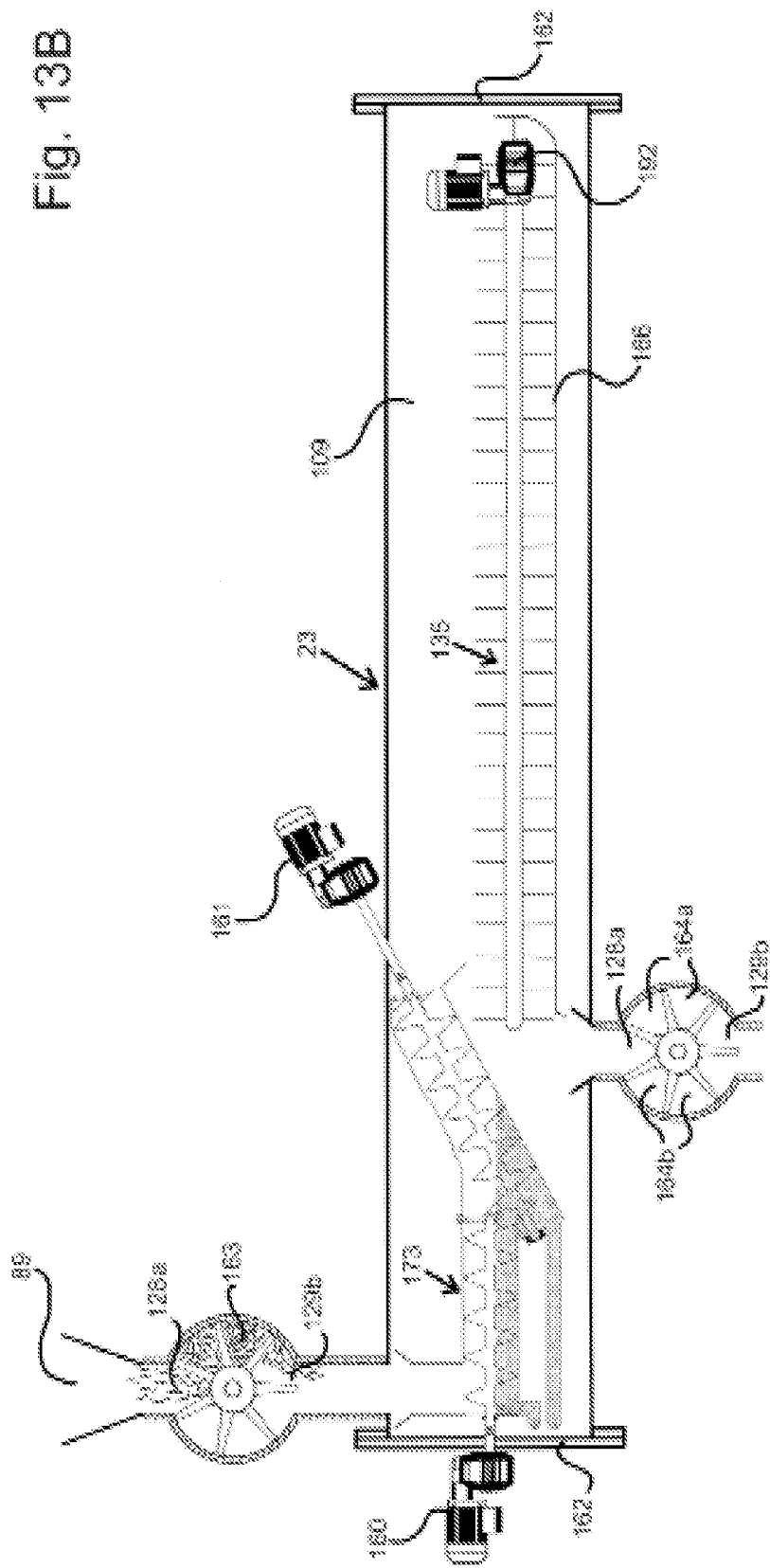

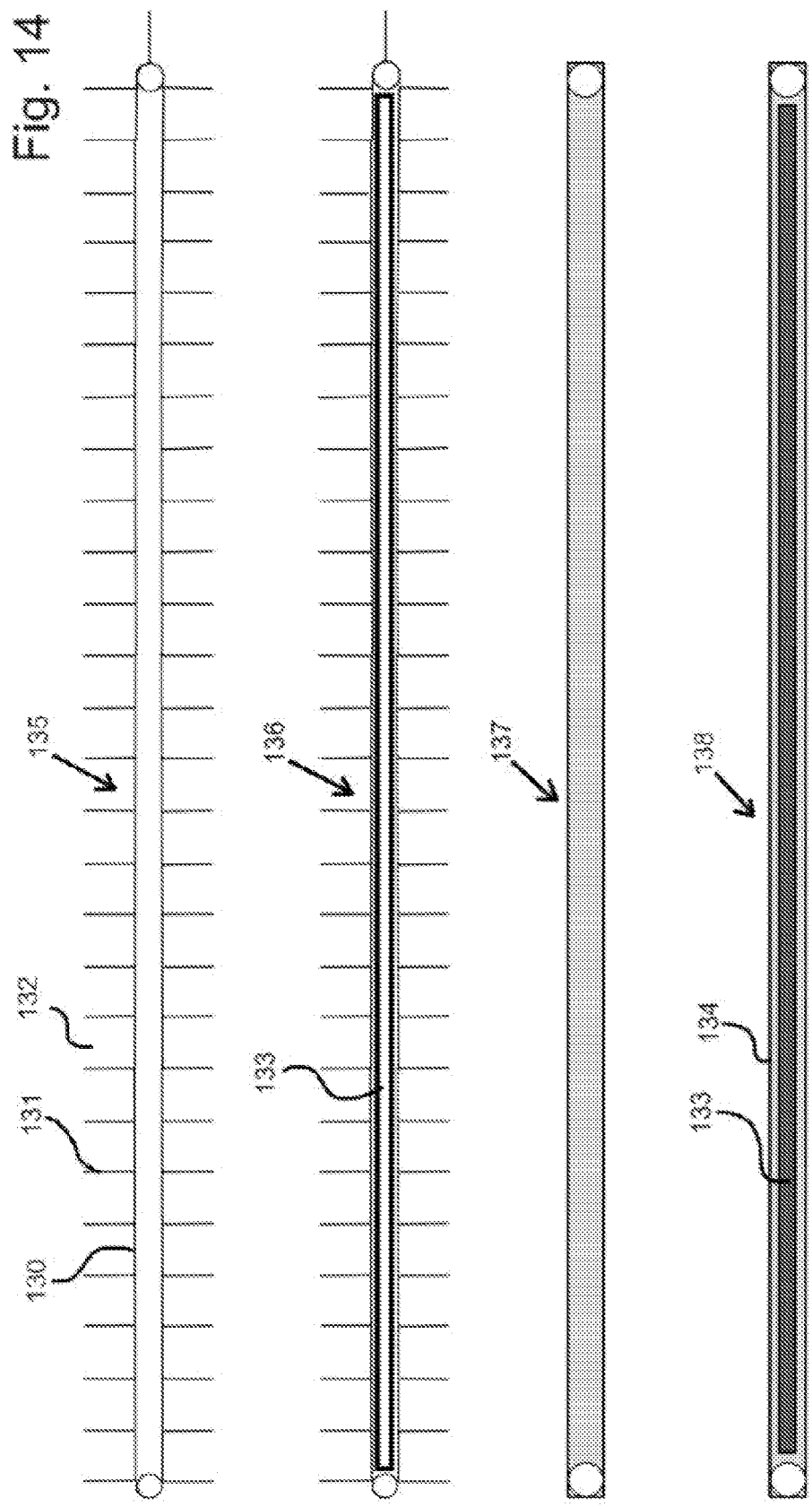

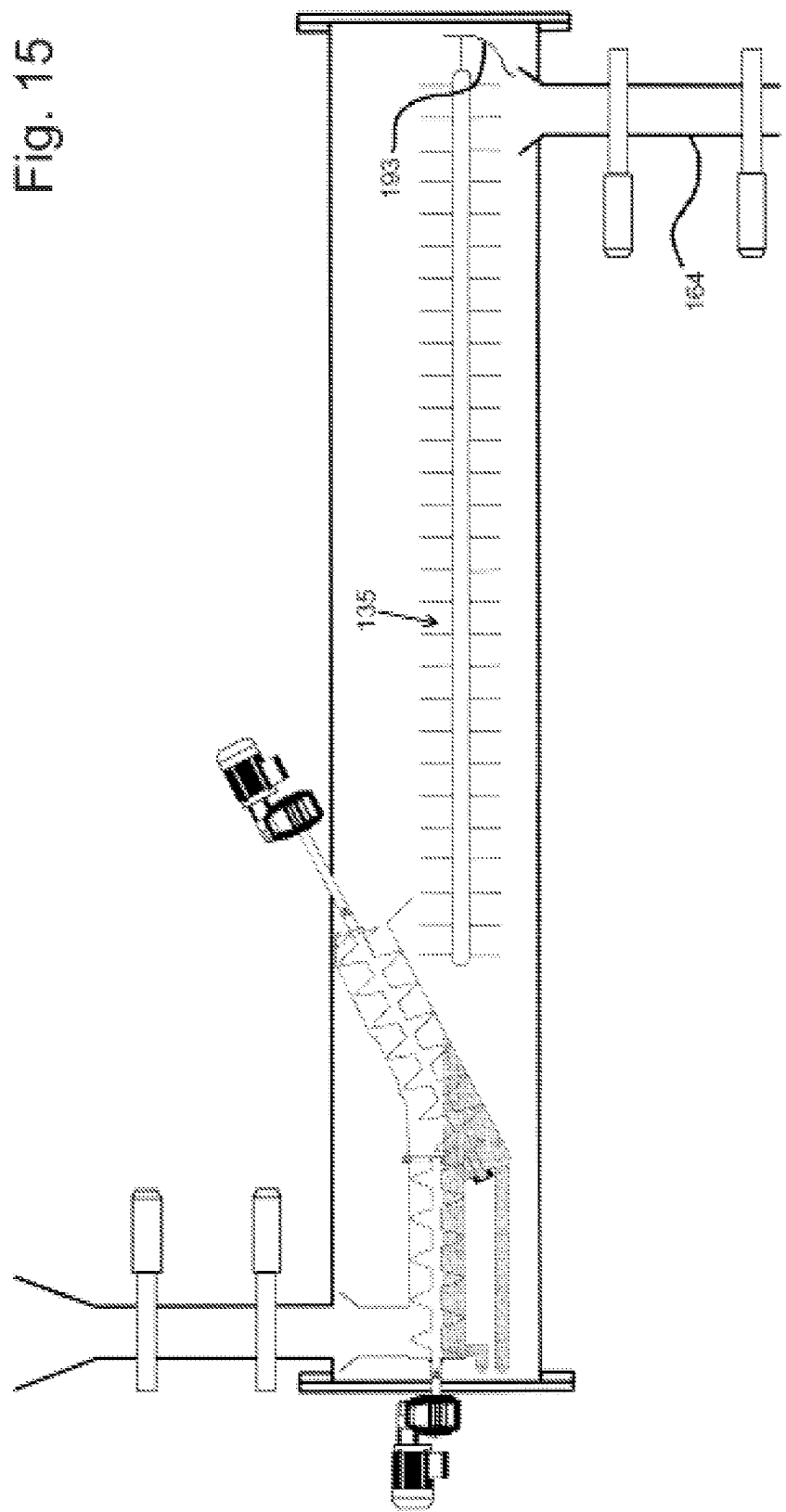

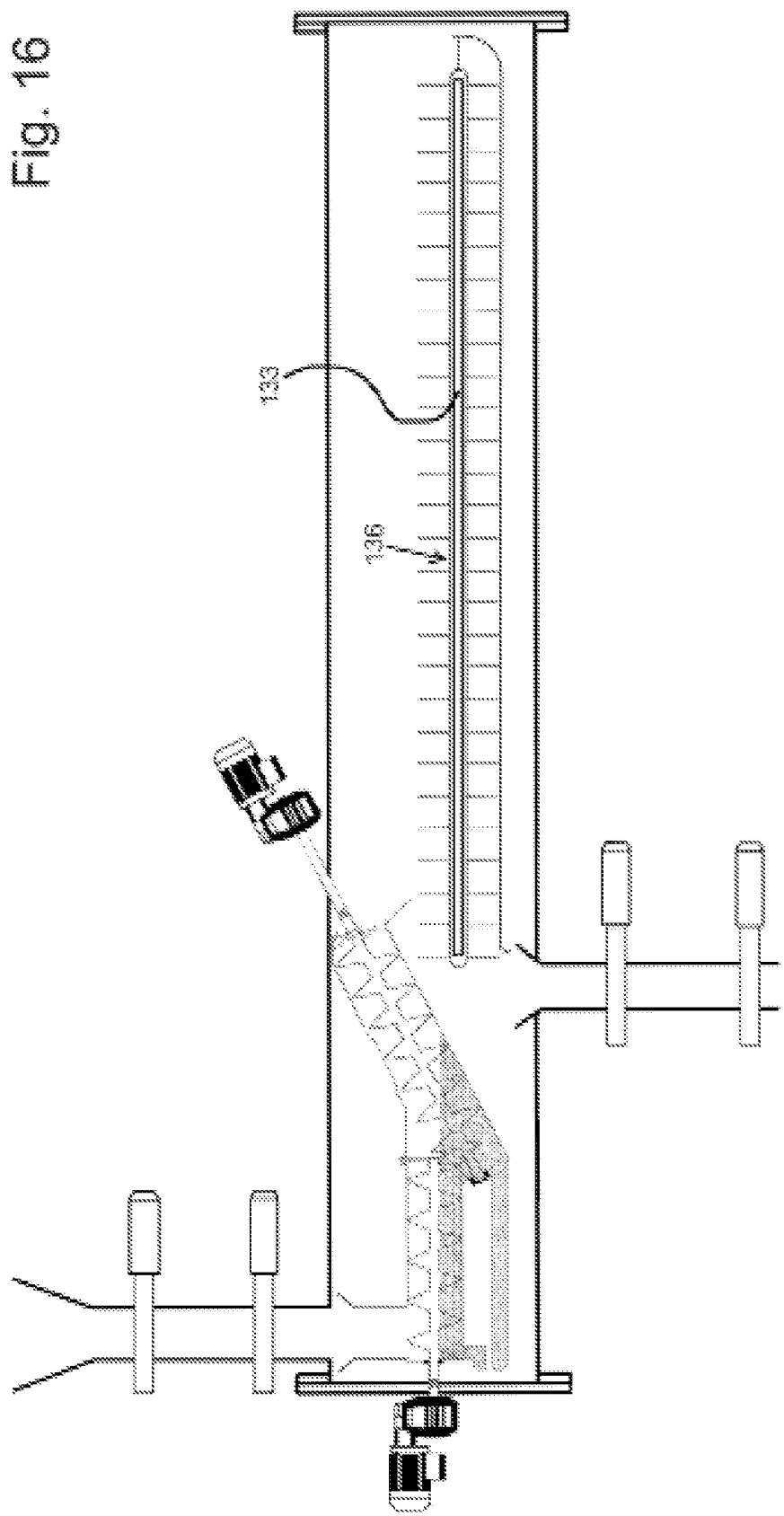

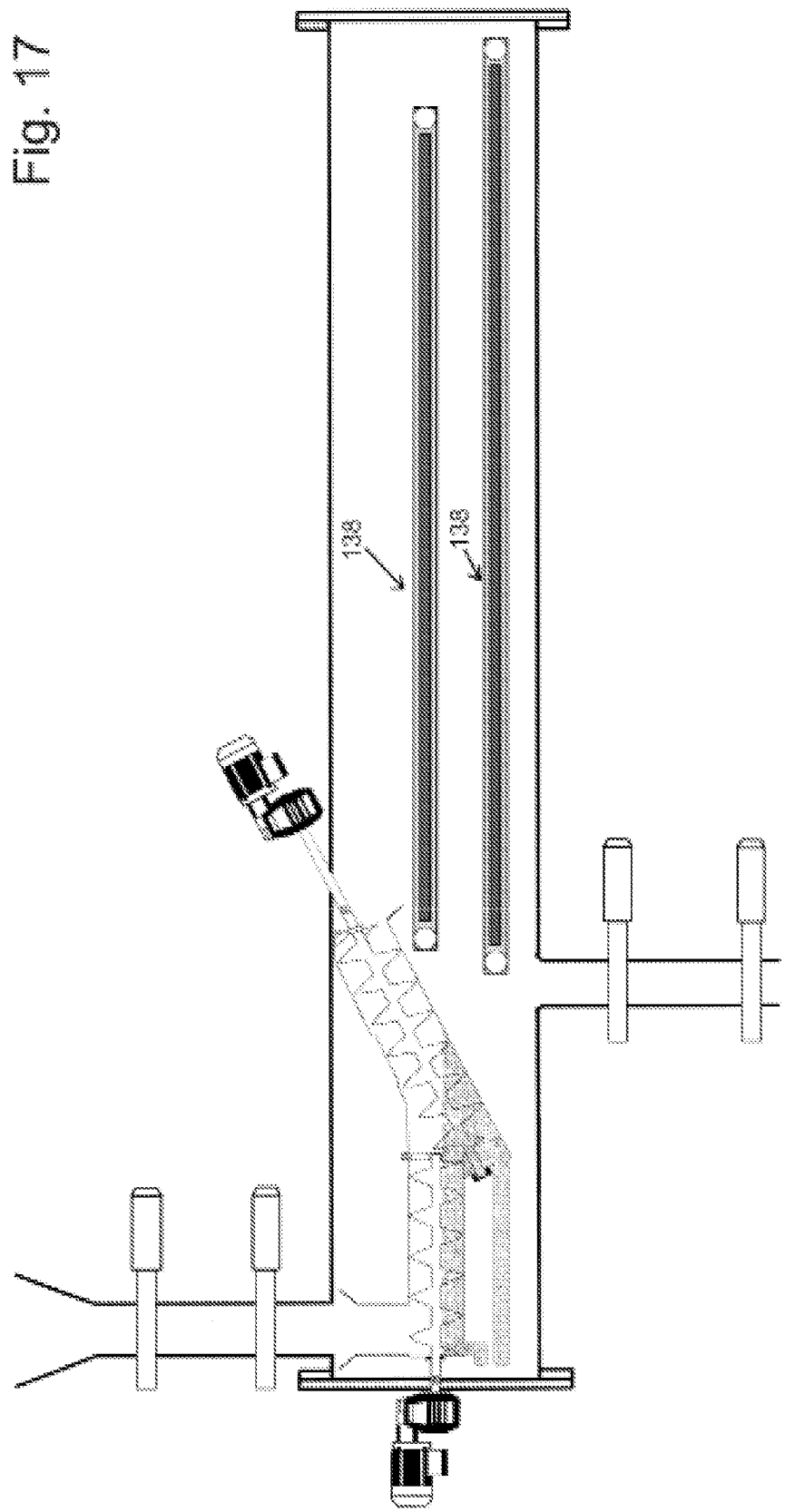

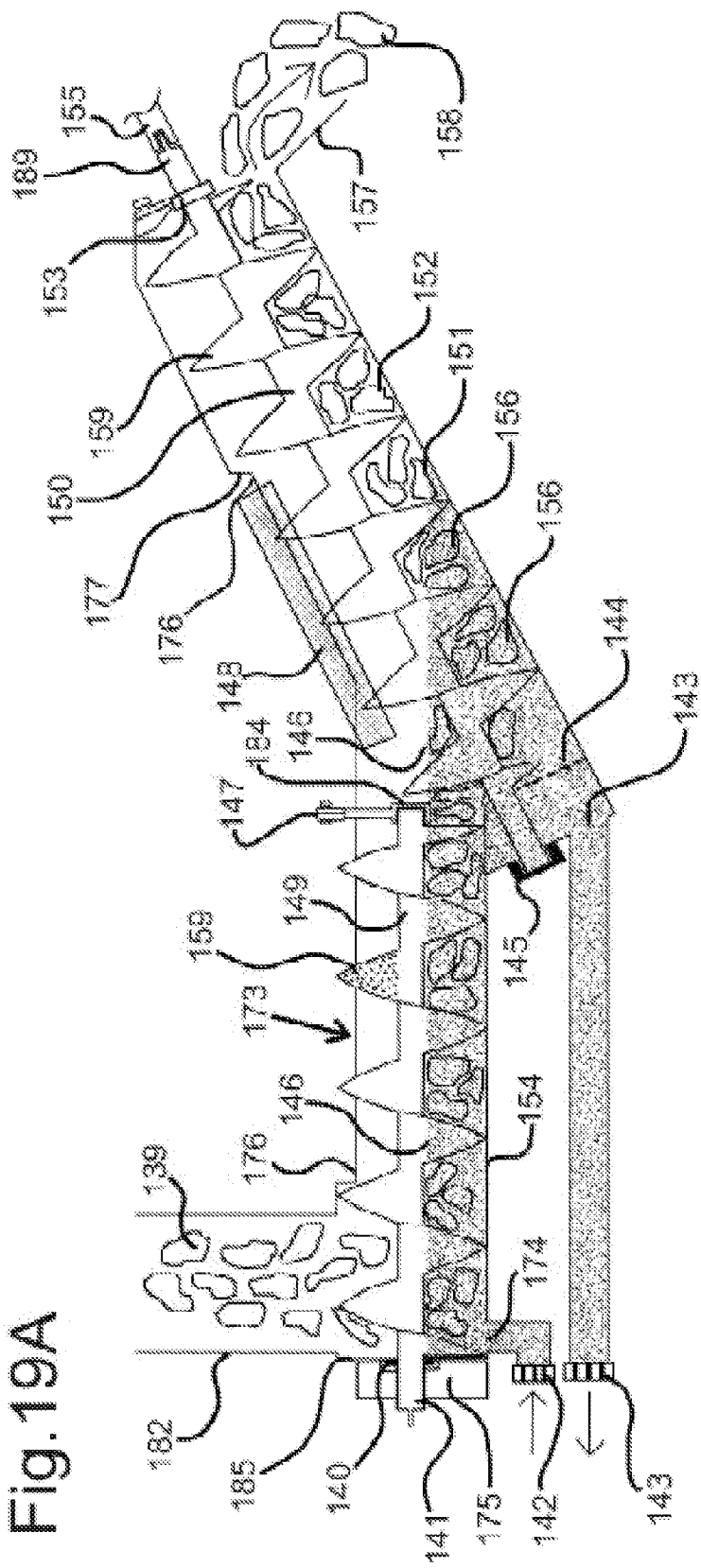

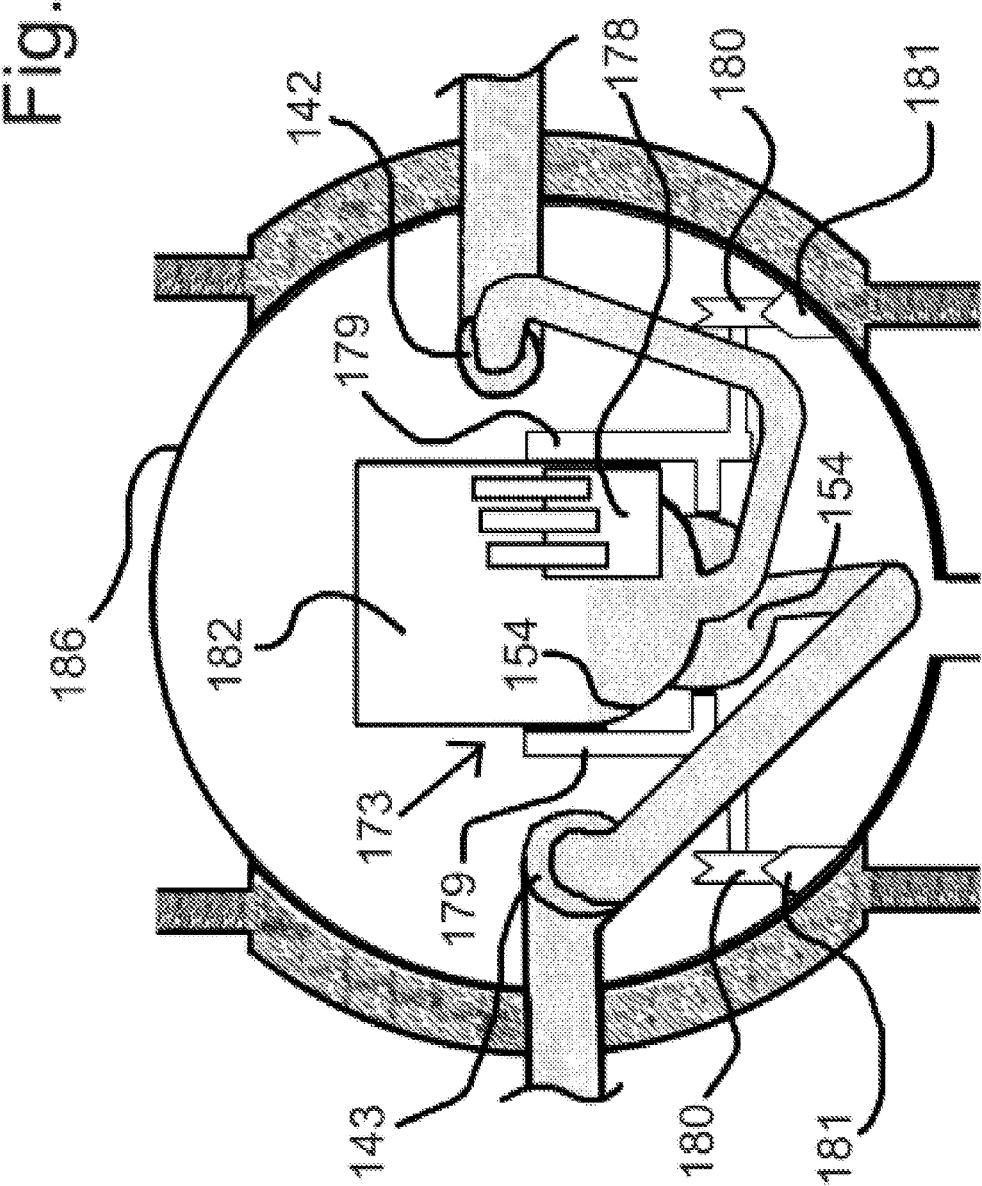

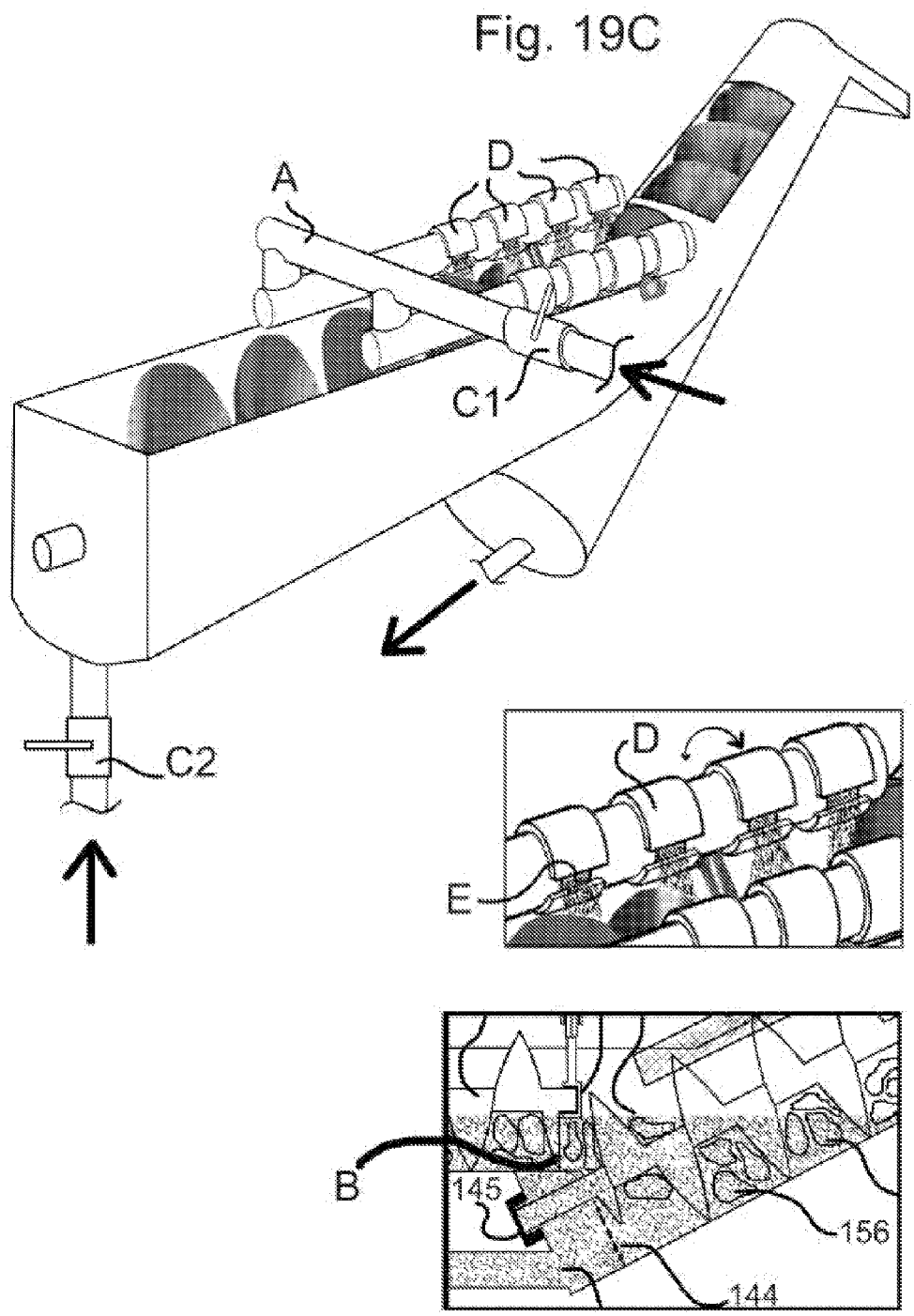

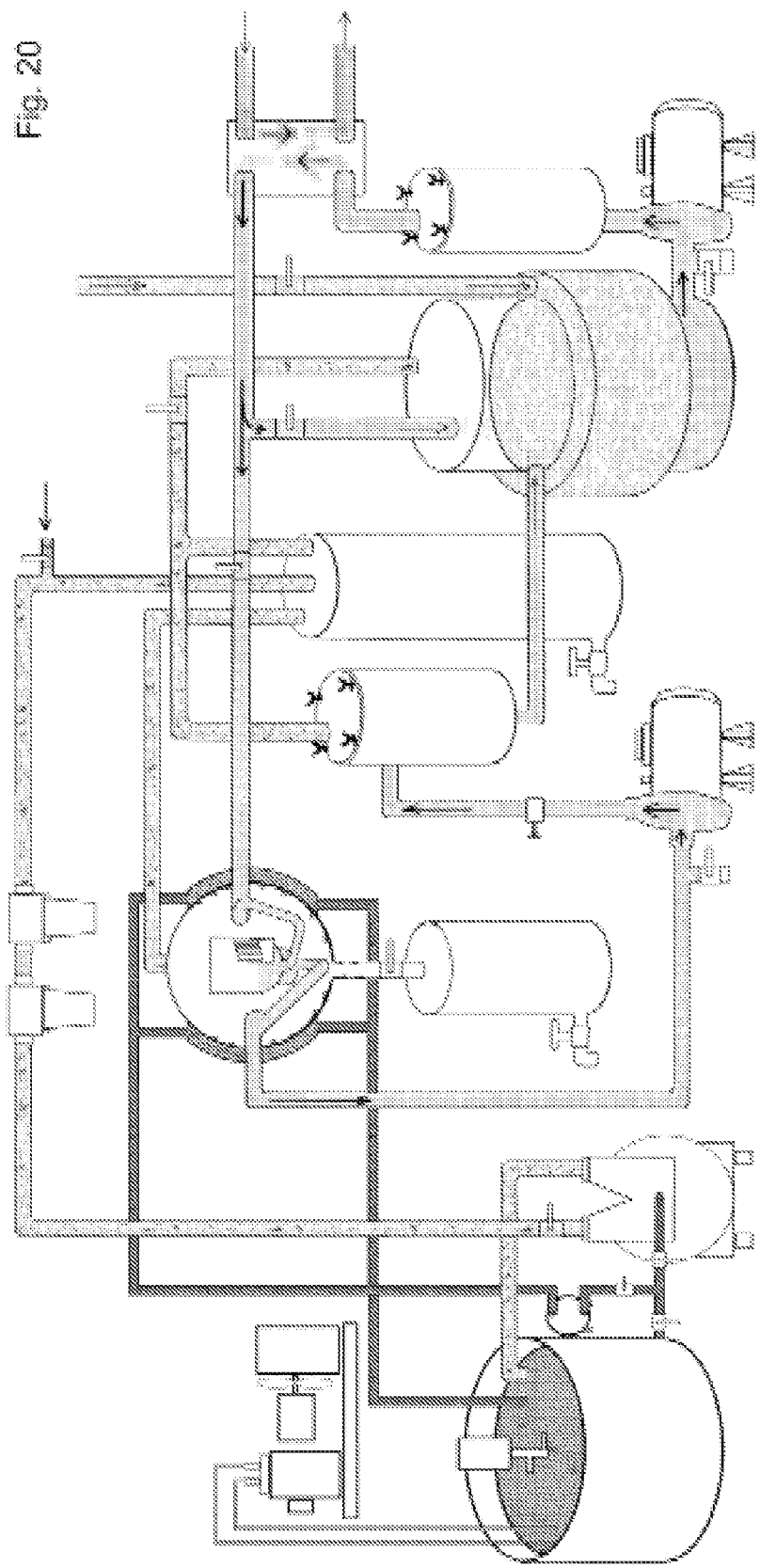

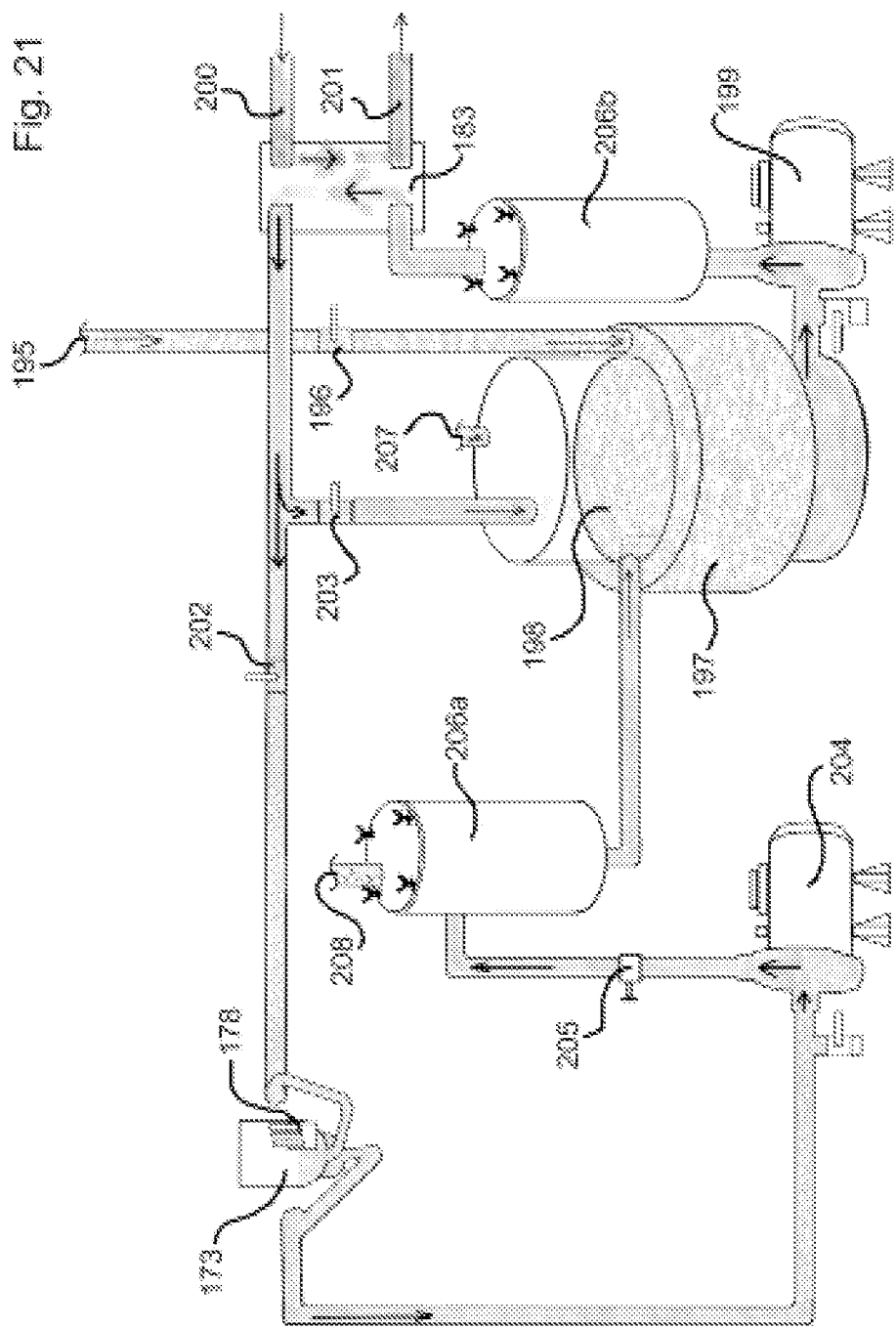

Fig. 24
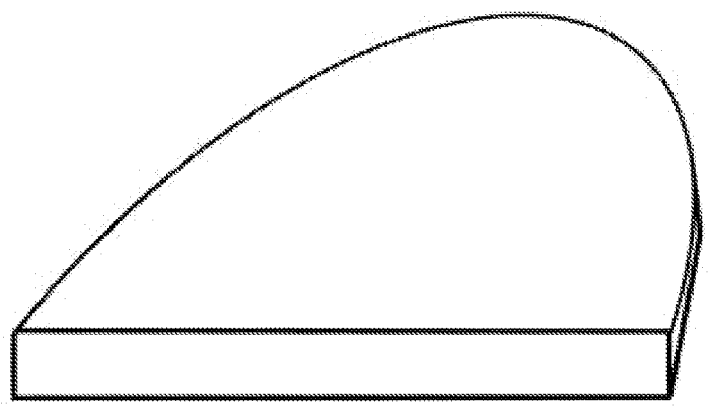
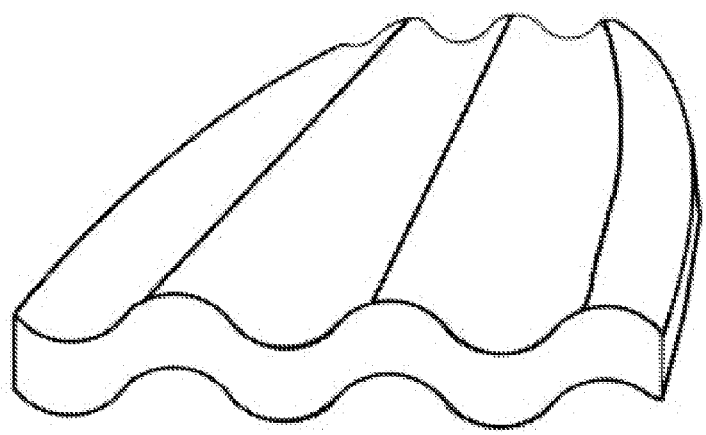
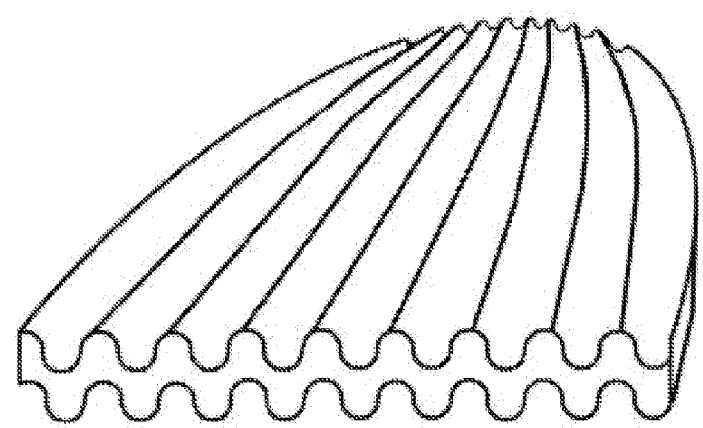

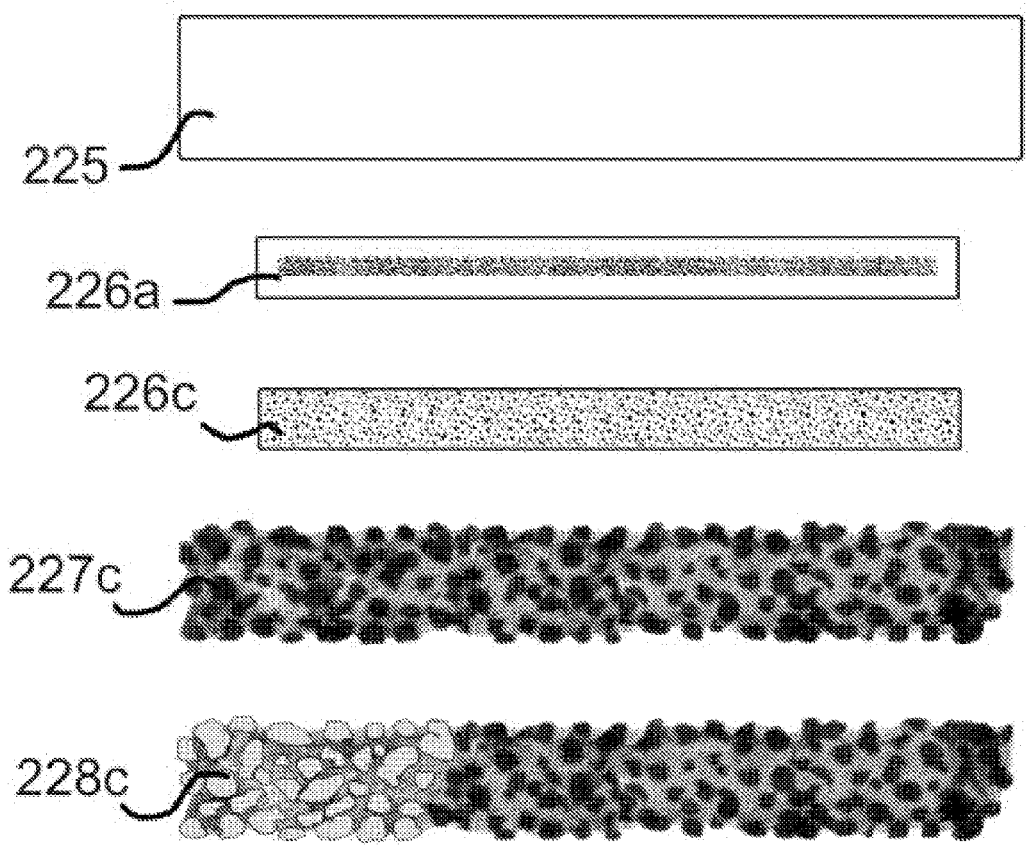

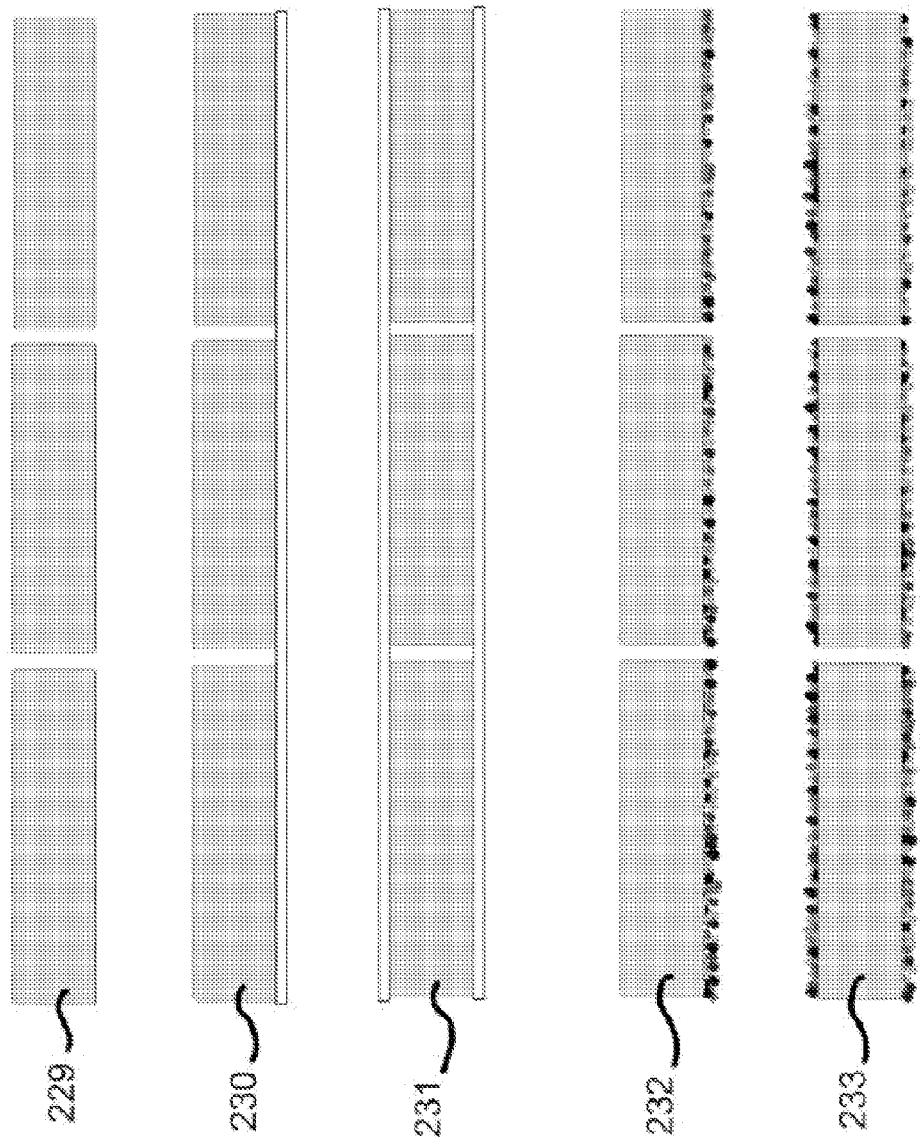

METHOD AND APPARATUS FOR THE PREPARATION OF A CRISP FOOD PRODUCT

CROSS-REFERENCE TO RELATED APPLICATIONS

This application is the national phase entry of International Patent Application No. PCT/IB2012/057634, filed Dec. 21, 2012, which claims the benefit of priority from South African Patent Application No. 2011/09473, filed Dec. 22, 2011, the entire contents of both of which are incorporated herein by reference.

FIELD OF THE INVENTION

This invention relates to snack food processing and in particular, to the drying, frying and expansion of a vegetable or fruit product first in a blancher and then in a continuous vacuum fryer system. The process is described herein with reference to fruit and/or vegetable based food products, but its use is not limited to these snack foods and it has application also for other foodstuffs, including animal based foodstuffs.

BACKGROUND TO THE INVENTION

In many food processing operations, pieces of vegetable or fruit are fried for the crisp industry and their fat content ratio is too high, resulting in food products that are unhealthy and unappetising.

Further the colour and shape of the raw product after frying has often changed dramatically from the original raw material being used. The sugar content in the vegetable used has the effect that the vegetable, after frying, has a slightly burnt taste and look to it. In order to limit the adverse effect of frying on sugars, raw fruits and vegetables are selected for their low sugar contents and many fruits and vegetables are simply not considered to be suitable for producing a fried, dry snack food, e.g. onions, tomatoes, watermelon, and many more A view is held in at least some circles in the snack food industry that fruit and/or vegetable based snack food products would be more appealing if they could retain more of their original shape, colour and taste.

Expansion of the raw material has also been attempted by many different methods although the result has not yet been favourable thus far, because the extent of expansion is often insufficient and/or the products lose their original shape.

The method currently used most extensively in the snack food industry for manufacturing crisps, involves the raw product having a long exposure to oil in a frying process and the end products having a high fat content averaging 32%-38% (all percentages herein are by mass). These processes are completely unsuitable for high sugar content fruits and vegetables, which burn/caramelise and thus acquire an unpalatable taste and texture, in addition to adverse health effects of burning.

Other methods used in the snack food industry include a process whereby the raw material is sliced and then conveyed through a liquid bath containing agents (such as additives, bleaches and starches) needed to change the material to meet the specification for the final product. The material is then conveyed directly to the fryer. These methods also result in a high fat content in the finished product.

If smaller batch methods of frying are used, the likelihood of contamination increases, because more human contact with the product is required. Batch fryer systems also typically produce products that are darker in appearance and more caramelised, and which has a higher acrylamide content. Acrylamide is considered to pose health risks. Batch processes are also typically commercially less efficient than continuous processes.

The present invention seeks to provide for the manufacture of a crisp snack product that retains the flavour, colour and taste of the raw product to a large extent and that has an acceptably low fat content. The invention further seeks to increase expansion of the raw product, preferably near to the initial size of the raw product, and to retain the expanded shape as far as possible in the end product. The invention seeks to provide these advantages for snack food products manufactured from various ingredients, many of which are not normally suitable for crisp processing, including fruits, vegetables and gelatinizable proteins.

The invention further seeks to conserve energy and to provide for the continuous operation of the vacuum expansion unit, thereby to reduce the human contact with the product and thus reduce the risk of contamination and breakage—preferably with no human contact to the product after slicing of the raw product.

In addition, the invention seeks to provide for snack food manufacturing with low skills requirements

SUMMARY OF THE INVENTION

According to a first aspect of the present invention there is provided method of preparation of a crisp food product, said method including the steps of:
  drying thin food pieces;
  exposing the thin food pieces to heat, to expand them, under vacuum;
  removing the thin food pieces from sources of heat, while still under vacuum; and
  cooling the thin food pieces, while still under vacuum.

The method may include a step of blanching the thin food pieces prior to drying them, e.g. by blanching them in a confined space while substantially retaining their moisture within the space, by retaining them between two sheets while exposing them to heat (e.g. generally impervious sheets), and/or by supporting them on a perforated sheet while blanching them and transferring them from the perforated sheet by applying an air stream.

The method may include humidifying the surfaces of the thin food pieces before exposing them to heat under vacuum.

The method may include exposing the thin food pieces to heat by submersing them in hot oil, preferably followed by quickly removing them from any source of heat, once they are removed from the hot oil, while still keeping the thin food pieces under vacuum. The method may include removing the thin food pieces from the hot oil by driving them along an inclined travel path by progress of the flights of a rotating helical screw.

The method may include exposing the thin food pieces to heat from microwave, infrared or radio frequency irradiation and the crisp food product produced by the method may have a fat content of about zero or a low fat content.

The method may include storing the thin food pieces for an extended period, after the step of drying them and before the step of exposing the thin food pieces to heat, under vacuum According to another aspect of the present invention there is provided a vacuum fryer comprising:
  a vacuum chamber equipped with means to retain the inside of the chamber under vacuum;
  a bath of hot oil inside said vacuum chamber;

a travel passage extending upwards from said hot oil bath at an incline;

a rotatable helical screw with a rotational axis extending at an incline, along said travel passage, said helical screw being configured to convey objects from the hot oil bath along the travel passage;

BRIEF DESCRIPTION OF THE DRAWINGS

For a better understanding of the present invention, and to show how the same may be carried into effect, the invention will now be described by way of non-limiting example, with reference to the accompanying drawings in which:

FIG. 1 shows a diagrammatic overview of apparatus and a process for manufacturing snack food products according to the present invention;

FIGS. 6A to 6D show schematic side views of blanching and drying apparatus of a blancher-dryer of FIG. 1;

FIG. 7 shows a detail schematic side view of the area marked 77 in FIG. 6A;

FIGS. 8A and 8B show alternative heating means for the blancher-dryer of FIG. 1;

FIGS. 9 to 13B, 15, 16 and 17 each shows a diagrammatic view of a different embodiment of a vacuum fryer of FIG. 1;

FIG. 14 shows diagrammatic views of different conveying belts for the vacuum fryer of FIG. 1;

FIG. 19A shows a preferred embodiment of a fryer inside the vacuum fryer of FIG. 1;

FIG. 19B shows a detail end view of the fryer of FIG. 19A;

FIG. 19C shows a perspective view of the fryer of FIG. 19A, with detail inserts;

FIG. 20 shows a diagram of the vacuum fryer of FIG. 19A and supporting systems;

FIGS. 21 to 23 shows detail of the supporting systems of FIG. 20;

FIG. 24 shows different types of slices of product processed in the apparatus of FIG. 1; and FIGS. 25 to 27 show diagrammatic cross-sectional views of products produced in the apparatus of FIG. 1.

DETAILED DESCRIPTION OF THE INVENTION WITH REFERENCE TO THE DRAWINGS

Figure 2:
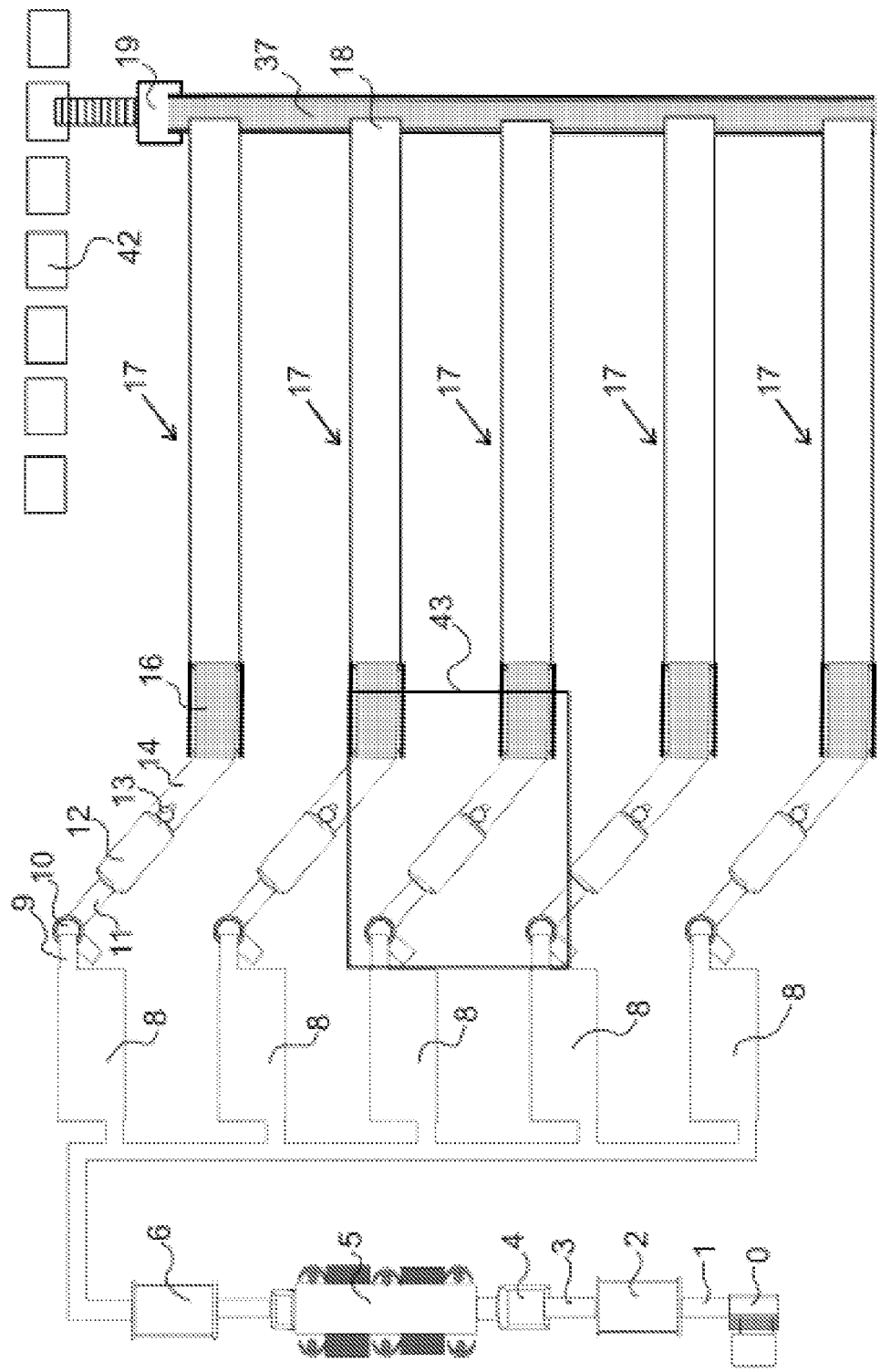
FIG. 2 shows a plan view of components numbers 0 to 19 of FIG. 1.

The apparatus and process of the present invention is described below with reference to the drawings.

FIG. 1

FIG. 1 shows a diagrammatic overview of a system or apparatus and a process for manufacturing snack food products according to the present invention, the process being continuous, but shown here in three consecutive lines, for the sake of illustration.

Raw material is received by means of a bin 0 that is lifted up into the storage hopper with conveyor 1. The raw material can be washed, semi-washed or unwashed when received and can include any selection from various vegetables.

Typical vegetables for use as raw materials in the process are: potato (including its cultivars such as B1, B13, van der Plank, Up-to-Date, Rosetta, Hertha, Undumbi, Congo Blue), sweet potato, parsnip, butternut, beetroot, mangle, sugar beet, carrot, zucchini, onion, sweet peppers, chilli, tomato, celeriac and pumpkin—each with its various cultivars. The selection of the vegetable raw material depends on the seasonal availability of the vegetables. The are other vegetables available that are not mentioned which could also be used as well as fruits and proteins from collagen, sinew and skin e.g. fish skin, fish tongue and kokotxas. References below to "vegetables" include fruit too, unless this is inconsistent with the context in the particular instance.

Fresh vegetables are supplied to a storage hopper 1. From the storage hopper with conveyor 1, the raw material is conveyed and transferred into a de-stoner and washer 2. The raw material exits the washer 2 into a hopper and conveyor 3 and is elevated into a storage hopper 4 that feeds the manually operated sorting table 5. This is where it is conveyed at a constant speed for the manual checking of the product for any contamination (eyes and any bruising that may have occurred in transportation) and removing it to clean the raw product before the final wash. The raw product is also sized at this stage so that the pieces of the raw product have generally uniform sizes and are ready for slicing. The raw material is then conveyed into a final washer 6.

The washed raw material then goes into an elevator 7 (such as a bucket elevator). The elevator deposits the material into a hopper 8. The material is moved into a slicer 10 by means of the vibration provided by a vibrating conveyer 9. It then falls onto a conveyor belt 11 which feeds the material into a tumble powder applicator 12. The powder is fed through a dispensing mechanism from the hopper of a powder applicator 13 over the tumbling vegetables that then exit and fall onto a vibrating table conveyor 14. On this vibrating table conveyor 14 the raw material is then separated as individual pieces side by side as one layer by the movement of the vibrating table conveyor 14.

Manual quality control 15 ensures that there are no slices with double layers and quality control at this point will ensure that there are no contaminated or rotten particles beyond this point. The vibrating table conveyor 14 feeds the loading area of a blanching belt 16 that leads into a blancher-dryer 17.

As an alternative option to the vibrating table conveyor 14 the manual quality control 15 can also load the blancher conveyor 16 while ensuring that there is a tightly fitted layer of side by side vegetable slices on the blancher conveyor 16.

The operation of the blancher-dryer 17 is described in more detail below. At point of removal 18 the product moves away from the blancher-dryer 17 and is conveyed up by a means of a lift 19 that feeds a hopper 20 that vibrates and moves the product forward at a specific rate to load a batch conveyor 21 that has a portion flight or bucket loading system to transfer the product into the hopper of a vacuum fryer 23 at a specified rate.

The product is loaded by the hopper with controlled valves 22 that feed the vacuum fryer 23. The product is removed from the vacuum fryer 23 by means of a valve controlled outlet chute 24 of the vacuum fryer 23. Product falls onto a conveyor belt 25 to a vibrating feed 26 which feeds a rotary seasoning applicator 27.

The seasoning is fed through a dispensing mechanism from a hopper 28 over the tumbling snack food that then exits into a hopper 29 that feeds the snack food into a bucket or flight conveyor lift 30.

The bucket or flight conveyor lift 30 feeds the snack food onto a succession of vibrating conveyors 31 and 32. The snack food is then conveyed to a multi-head scale 33 and then falls through a metal detector 34 and enters a form fill machine 35 where it is packed and sealed. Thereafter it is conveyed to a packing station 36.

This system shown in FIG. 1 has the structure for a complete computerised integrated manufacturing process.

FIG. 2

FIG. 2 shows a plan view of the components of numbers 0 to 19 in FIG. 1, which includes the vegetable washing and sorting and the processes of blanching and drying the vegetables. The numbers in FIG. 2 correspond to the numbers in FIG. 1.

The blancher-dryer 17 can be a microwave, radiofrequency, infrared or solar heated system, but in the illustrated embodiment, the blancher-fryer uses an oil burner to heat oil that is used as a heat transfer medium.

The embodiment of the invention shown in FIG. 2 has multiple processing lines. Multiple lines could be used, for example in a case in which the final product consists of a mixture of vegetable crisps. Separating the vegetables into parallel lines at the primary stage of processing assists in ensuring that colours and flavours do not contaminate one another. For example, beetroot, butternut, carrot, parsnip, sweet potato or other vegetables could be separated.

There may also be other advantages to having separate lines. Some of these advantages may be ergonomic. (In a different embodiment of the invention, one or more vegetables could be processed on a single line.)

Number 37 indicates a conveyor used in the case of multiple lines, to convey the material to the lift 19.

If desired, the product produced by the stages of the process shown in FIG. 2 can be stored for an extended period before proceeding to the rest of the process. Allowance can be made for storage of the partially processed product after the blanching and drying stage. These stages up to the blanching and drying stage and the subsequent stages may therefore be conducted at separate premises and 42 shows storage bins which could be used if the product will be stored prior to further processing. Depending on the characteristics of the product at this stage, the product may be stored for several weeks or months under refrigeration. This could be required if the moisture content of the product would result in spoilage under non-refrigerated conditions. Alternatively or additionally, preservatives such as sodium metabisulphite and/or other antioxidants or preservatives could be added at the slicer 10 or the powder applicator 13. The period of refrigerated storage could be in the range from 24 hours to 9 months If the product contains preservatives, a storage temperature of 5-30° C. could be suitable. If the product contains no preservatives, the product should preferably be stored at 0-12° C. until further processing. Lower temperatures in the range of 2-4° C. are preferred.

Sodium metabisulphite could be added to the powder blend before blanching to reduce the risk of contamination during storage at room temperature.

This storage will allow a fruit or vegetable farmer to conduct the initial process of the blanching and drying at the farm where the fresh fruit and/or vegetable is harvested and is immediately processed, thereby eliminating the exposure of the raw fruit and/or vegetable to uncontrollable transport and pre-holding conditions such as high temperature which contribute to spoilage, sugar build-up, over ripening, or time delays which may result in the conversion of starches to sugars.

The partially processed product may be stored under controlled conditions, such as refrigeration, if deemed necessary due to the moisture content and other characteristics of the specific product. The blanched vegetable and/or fruit can then be supplied from the farmer already partially processed to a snack food processing plant comprising the vacuum fryer 23 and packaging equipment.

The vegetable farmer is then able to prepare the vegetable as the seasonality of the vegetable allows. The farmer can then sell the partially processed vegetable to the snack food processing plant through the year at a beneficial price structure.

FIG. 3

Figure 3:
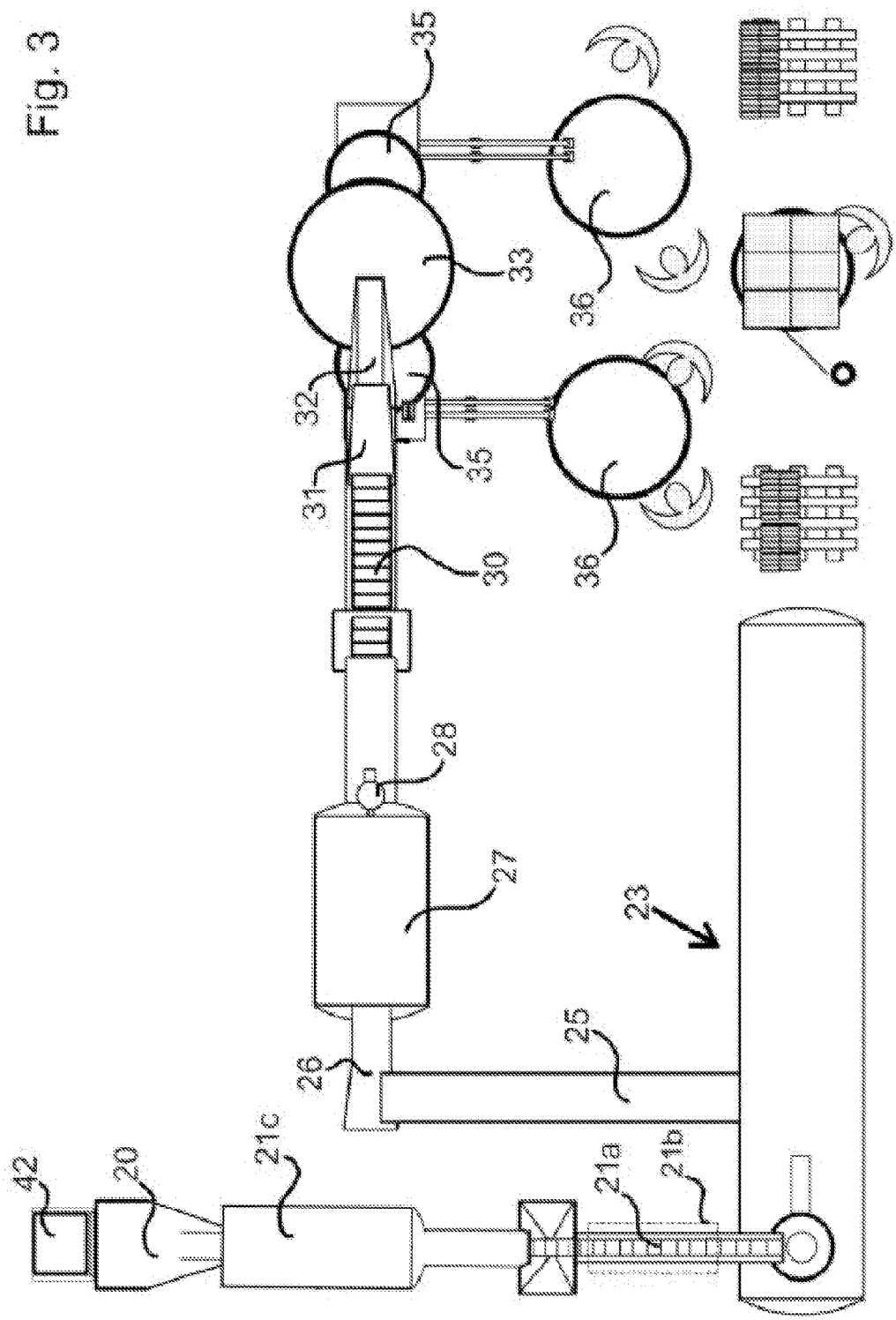
FIG. 3 shows a plan view of components numbers 20 to 36 of FIG. 1.

FIG. 3 is the independent vacuum frying processing line where the pre-dried raw material is processed into a snack food.

FIG. 4

Figure 4:
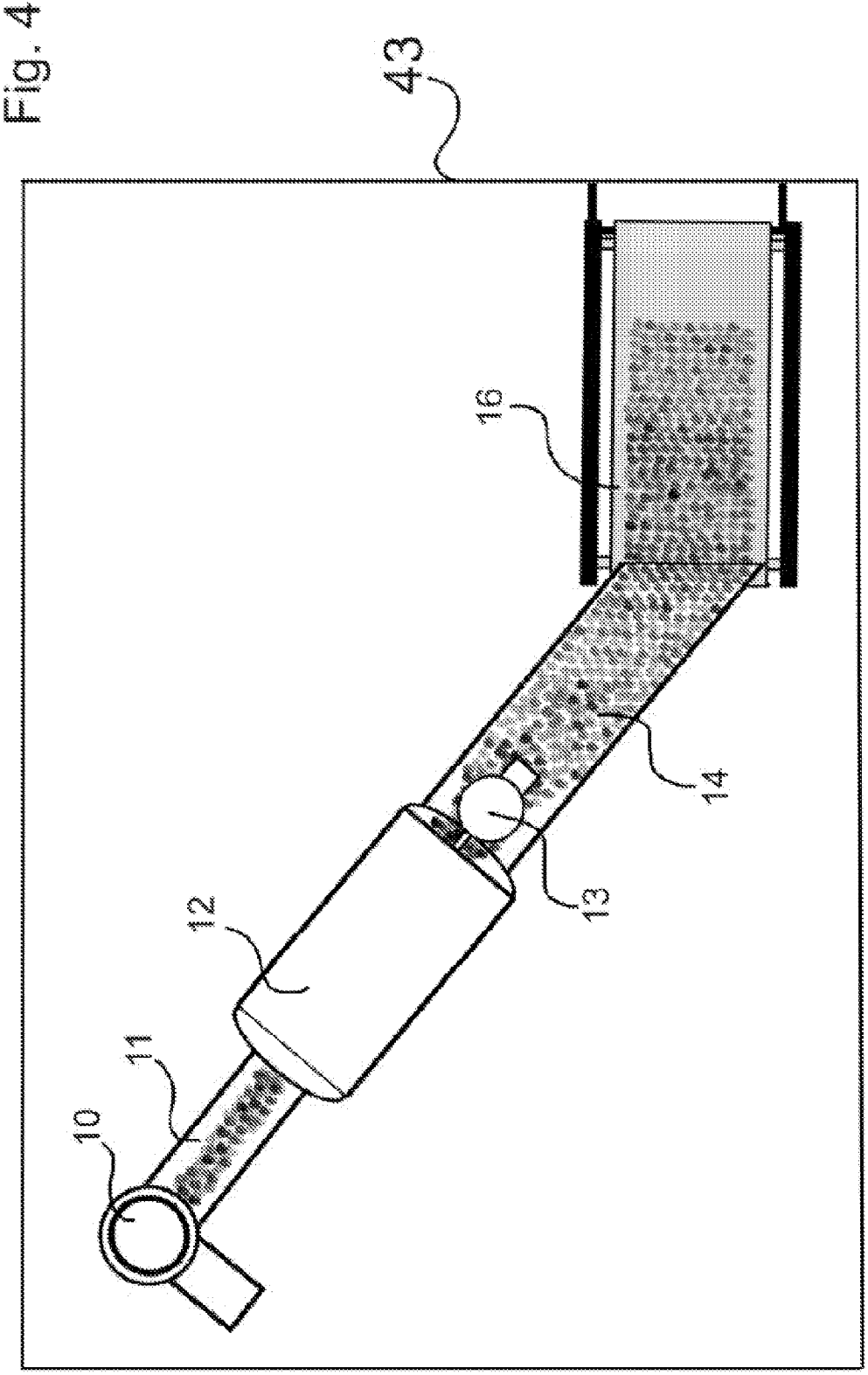
FIG. 4 shows a detail plan view of the area marked 43 in FIG. 2.

FIG. 4 is a detail view of the area indicated by number 43 in FIG. 2. This shows the configuration of the slicer 10, powder applicator 12 and vibrating table conveyor 14 onto the blanching belt (or loading bed) 16 ensuring that the vegetables entering the blancher-dryer 17 are in one layer and are tightly packed.

FIG. 5

Figure 5:
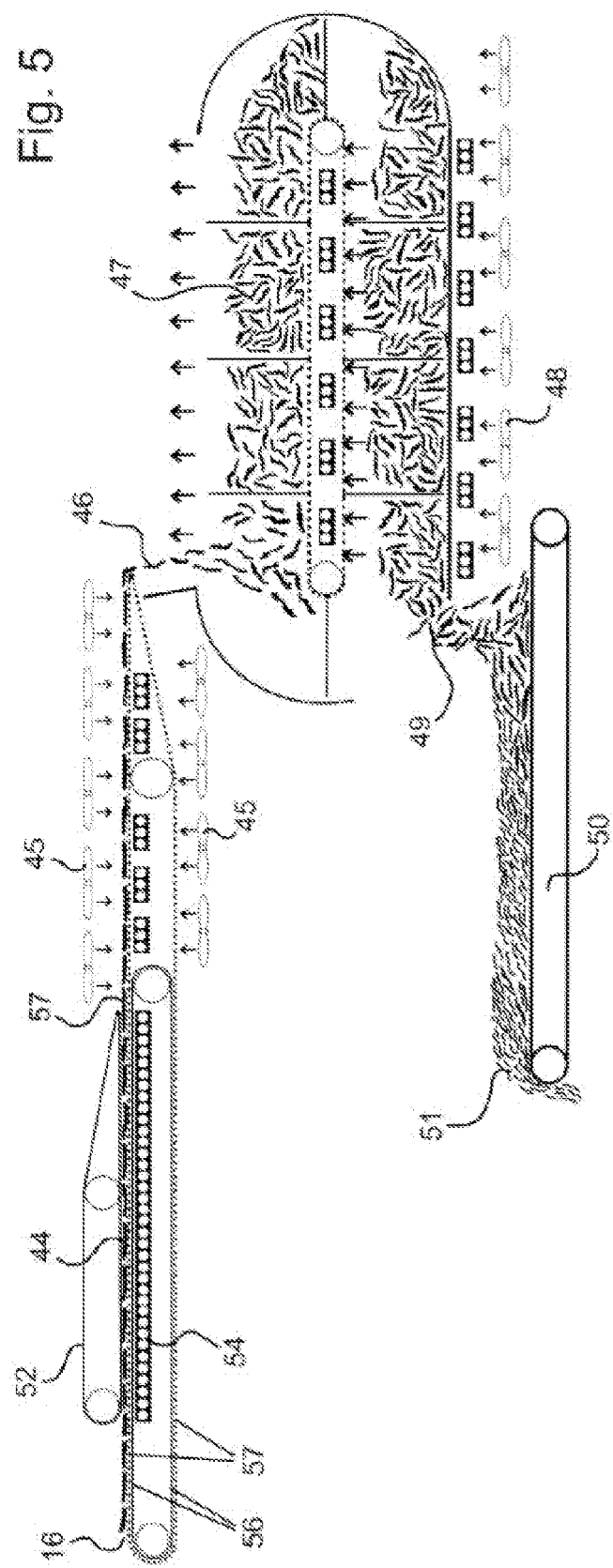
FIG. 5 shows a schematic side view of a blanching and fluidized bed of a blancher-dryer of FIG. 1.

FIG. 5 shows a schematic side view of a blanching and fluidized bed inside the blancher-dryer 17. The product enters the blancher-dryer 17 on the loading bed 16 and the product passes through a blancher 44. The product is then air dried 45 at temperatures between 75-80° C. and then the surface dried slices enter a fluidized bed 46. In the fluidised bed, the product slices are kept in motion within a high velocity fluidized bed 47 while being conveyed in a perforated conveyor, with hot air ranging from 55-80° C. 48 being passing through the fluidized bed from below. At the exit point 49 of the fluidised bed, the dried product has a specified moisture content ranging from 3-25%. It is then removed with a removal conveyor 50 and then the product exits 51 for the destination for storage or further processing.

FIG. 6A

FIGS. 6A and 6B, show alternative apparatus for use inside the blancher-dryer that is generally identified by reference numeral 17 and is also referred to herein as a "blancher". The blancher 17 includes an upper cooking area 52, where the raw product is partially cooked or blanched, and a lower area 53 where the blanched product is dried.

In the upper cooking area 52, a heat source is provided in the form of a bed 54 comprising an array of passages through which heating oil or other heating fluid is circulated. The oil in the oil heater 54 is maintained at a constant temperature of about 180° C. The heat source 54 could be any one of a variety of heat sources, e.g. it could include microwave emitters, radio frequency, infrared, resistance heaters, combustion heaters, or the like and the position of the heat source can be varied.

Above the oil heater 54, an endless top belt 55 is provided between pulleys and the top belt is of a generally impervious construction and is coated with a friction resistant ("non-stick") and heat resistant material such as PTFE (Teflon). As shown in FIG. 6A, the top belt rotates so that it travels from left to right in its bottom run and from right to left in its top run (counter-clockwise).

Below the top belt 55, there is an endless heater belt 56 of similar construction and which rotates in the opposite direction, with its top run travelling from left to right. A carrier belt 57 is provided on the outside of the heater belt 56 and rotates in the same direction as the heater belt. The carrier belt 57 is perforated and defines numerous apertures (e.g. it can be of a mesh construction) and is also coated with a friction and heat resistant material such as Teflon.

The heater belt 56 and carrier belt 57 are in close contact in their top runs and separate at a separation roller 58. The carrier belt 57 continues at a downward angle, carrying the pre-blanched slices 61 into and between the roller 59. When the blanched product reaches the roller 59, it is held in contact with the carrier belt 57 while being inverted, by a bubble plate curved sheet 60 used as a shield, until it leaves the shield and is received on top of a drying belt 62 and is thus sandwiched between the carrier belt 57 from above and the drying belt 62 from below.

Shortly after leaving the roller 59, the product slice travels past the air nozzle 63 which assists in transferring the slice from the carrier belt 57 to the drying belt 62 with a gentle air flow. The transfer of the product slice 65 from the carrier belt 57 to the drying belt 62 is further assisted by a sharp turn of the carrier belt 57 around a roller 64.

The upper cooking area 52 of the blancher 17 and the lower drying area 53 are not sealed off completely, but are separated by their construction—as represented in FIG. 6A by a dividing wall 67. The area 53 below the wall 67 is supplied with air that is heated and dried and the temperature and humidity of the air is controlled. Four drying belts 68a, 68b, 68c, and 68d are provided in the drying area of the blancher. The drying belts 68a and 68b are running at the same speed, however drying belts 68c and 68d have independent speed control to be allow control the final moisture content of the product 69 exiting the drier 53. The drying belt 68a is of a construction that allows air to pass through it with ease—e.g. it may be of a Teflon coated mesh construction, same or similar to the carrier belt 57.

When the slices of raw product 71 reach the blancher 17, they are received on top of the carrier belt 57 (with the heater belt 56 immediately below it) at the receiving end 72. The raw product slices 71 then travel on top of the carrier and heater belts 57, 56 and the bottom run of the top belt 55 makes contact with the product slices, before they travel to the oil heater 54. The top belt 55 serves to keep the product slices in place and to contain moisture and it need not make firm contact with the product slices. Likewise, the heater belt 56 need not make contact with the carrier belt 57. Effectively, the product slices are carried on the carrier belt 57 generally sandwiched from above and below, by the top and bottom heater belts 56, 57. The belts 55,56,57 are each about 1200 mm wide and extend generally across the inside of the upper part of the blancher 17 and the gap between the top belt 55 and heater belt 56 is about as much as the thickness of the slices—e.g. typically of the order of 1 mm to 3 mm.

The product slices travel in this sandwich arrangement along with the top, heater and carrier belts 55, 56, 57, all travelling at the same speed, past the oil heater source 54, as shown by reference number 73 in FIG. 6A.

The oil heater 54 is not situated directly below the top run of the heater and carrier belts 56, 57, but is spaced below these belts in close enough proximity to heat the product slices carried on these belts.

At 53 in FIG. 6A, the heater elements 74 run from side to side of the individual drying beds with a gap in between 70. As the material is conveyed over the heat elements 74, the heat element ensures even heat distribution over the width and the length of the belt, this ensures that the centre of the drying belt and the edges are equally heated throughout the drier, the heating element of the drier is of the same type as element 54. The temperature is controlled by valves that can reduce the oil flow through the individual set as differentiated by 68a and 68b at a temperature range from 65-80° C.

Belt Washing Mechanism of the Blancher

After the blanching process, the belts 56, 57 proceed towards a belt washer 38. While the product slices are being blanched, any drops that may form pass through the apertures in the carrier belt 57 and land on the heater belt 56 and may caramelize and contaminate the belts if passed through the system continually.

These drops are thus removed from the heater belt 56 and the carrier belt 57, as they are passed through the belt washer 38. As the belts come together, exiting the wash, a fan 39 blows off any excess moisture. This assists in preventing browning or burning of the drops, which could impact on the flavour of the product. A similar configuration is used for the top belt 55 washer 40.

As the belt 55 exits the product blanching process, it passes around a rounded "knife-edge" 41, with an air blower 75 directly at the exit point of the product. This sharp rounded edge 41, assisted by the air blower 75, ensures that there is no product left sticking to the belt 55.

As shown in the area marked by reference number 77 in FIG. 6A (and shown in detail in FIG. 7), there is a mister 76 that sprays a fine mist of water onto the raw product before it enters the blancher 17, if required. This fine mist of water assists in adding a small percentage of moisture to the raw product. The reason for this would be that some vegetables are aged and lacking in the required moisture content for the process. For e.g., aged parsnip, aged butternut and aged sweet potato with a honeycomb inner structure. The process allows for fresh and well-aged vegetables that verge onto a dry and even a rubbery texture.

FIG. 6B

Belt 56 is separated by means of roller 58. The belt 57 however continues further around roller 59 and 64. A product slice is shown in FIG. 6B, with reference number 65, in a position between the air nozzle 63 and the sharp turn of the carrier belt 57.

FIG. 6C

FIG. 6C shows an alternative arrangement to that shown in FIGS. 6A and 6B, in which the belt 56 is allowed to continue around roller 59, and is separated before the air nozzle 63 by means of a roller 66. This allows adequate space to incorporate the air nozzle 63 between roller 59 and roller 64. Further the explanation as referring to 6A and 6B is applied.

FIG. 6D

FIG. 6D shows an alternative arrangement to those shown in FIGS. 6A to 6C, in which the bubble plate shield 60 is replaced by a motorized belt shield 168. The belt 56 is separated by means of a roller 58. The belt 57 however continues further around the rollers 59 and 64. A product slice is shown in FIG. 6D, with reference number 65, in a position between the air nozzle 63 and the sharp turn of the carrier belt 57. Drive rollers 169 and 171 are connected by chains and mechanically driven, to drive the belt shield 168 that is made of the same material as the top belt 55 and that extends around idler rollers 170. A knife edge rotating fine roller 172 is also provided and all five driven rollers 169, 171, and 172 are geared down to run at the same speed. A scraper 173 ensures that no product 65 continues beyond this point along the belt 57. At the outside at the loser edge of the belt 68, there may need to be a supporting pulley 190 to nip the belt around the knife edge roller 172, yet ensure that the belt remains limp around the drive 59.

FIG. 7

This shows a detail of the area marked 77 in FIG. 6A. A spray mechanism 76 is provided which can be applied to moisten the vegetables if they are fairly old and dry (such as aged butternut, rubbery parsnips and honeycombed butternut).

FIG. 8A

This is to shows an alternative heat element 78 that runs down the length of the drier 53 sections, from end to end. These can be positioned as two or more sets underneath the bottom belt and above the other top belt. Additional heat elements may be positioned in between the conveyor belts as indicated by number 79.

FIG. 8B

There are four individual radiator fin sections used as heat exchangers 82, running the full length of the drier, side by side. In the centre of these fins 82 there are pipes 83 running through the fin sections, hot oil 84 is passed through these pipes. There are two side baffle panels 80 and three internal baffle panels 81 that rest in between and on the radiator fins 82. The air is passed from the bottom 85 of the unit and through the heated fins 82, thereby heating the air. The air is forced upwards by the fans from the bottom area 85 and as the air passes through the fins 86 it is heated and is pushed upwards towards the product above. This heated air passes over and around the slices reducing the moisture content of the product. The relative humidity of the drier can be controlled to reduce the case hardening of the product slices.

FIG. 9

This configuration is an embodiment of the vacuum fryer 23 as shown in FIG. 1.

Raw material can enter the vacuum fryer 23 in three different forms:

Raw Material with Oil Added Prior to Vacuum Expansion

This raw material 89 is the raw material that has been blanched and dried, then pre-weighed, and loaded into a rotary tumbler while oil is sprayed over the surface of the raw material, coating the slices. The oil content can vary from 3-20% and this is controllable. This is a batch process. The prepared product is stored ready for vacuum expansion.

Raw Material with No Oil Added Prior to Vacuum Expansion

The raw material 90 is the raw material that has been blanched and dried and brought to a specific moisture content ranging from 12%-25% that is required for the following process. No oil is added to the product.

Raw Material with a Combination of Moisture and Oil Added

Process: The raw material 89, 90 enters 87 the fryer 23. The material enters by means of a set valve gates 112. The product enters a hopper 92 within a microwave vacuum chamber 109 and there is an opening 93 through which product passes by means of friction from a conveyor belt 88.

The hopper 92 in the vacuum chamber 109 prevents the material from entering all at once. The product enters through an opening 93 of the hopper that is conveyed on the belt 88 by means of friction and moves towards a rotary brush 94 (or multiple configurations thereof) above the conveyor belt 88 that controls the amount of product 103 passing through towards the microwave.

The product enters a labyrinth or prison 96 at 95 through a gap 102 of about 5 mm-30 mm. This assists in ensuring that the product is evenly distributed onto the conveyor belt 88 for microwave heat transfer on the product.

An upper run 106 of the conveyor belt 88 runs through the microwave unit and on its return, its lower run 107 runs underneath the microwave unit. The conveyor belt 88 is a continuous Teflon coated belt.

The internal microwave unit 108 is constructed from household higher powered microwave ovens 97 which are connected side by side. Each microwave oven has its own individual control and magnetron. All unnecessary components of the microwave ovens are removed and the controls for the magnetrons are linked up to a central control for the entire internal microwave unit 108. An outer housing 105 of the microwave unit 108 is of a porous faraday cage structure, allowing the moisture to pass out of the microwave unit 108 into the vacuum chamber 109. The holes in the faraday cage structure 105 are 0.5 mm-5 mm in diameter. The top, bottom and sides of the internal and external microwave structure are of a suitably coated faraday cage.

A prison 96 is situated at the entrance and exit to the microwave section with the continuous conveyor belt 88 moving through the microwave ovens 97. As the product 110 enters the microwave unit 108 it undergoes a cooking process and exits the microwave unit at 111 continuing through the prison 96 towards the drop-off point 101 onto a discharge belt 98. The product is then accumulated 104 to a suitable level for discharge into the drop off point 99.

The discharge belt 98 travels at a different speed from the microwave belt 88 loading the belt to a suitable discharge for the batch exiting process 99.

An alternative embodiment of the invention can be incorporated as radio frequency as the mechanism for heat expansion under vacuum of the product.

When using a vacuum fryer in which microwave irradiation is used as heat source to heat the product, the oil contents of the final product can be zero (owing to the fact that oil need not be added to the product before heating, as described above), but it may be desirable to add oil, e.g. be spaying on to the product before the heating step. The quantity of oil can still be low and fat contents of about 8% to 10% are considered to be acceptably low and to enhance product palatability. Lower fat content has health benefits. These advantages can also be achieved if the product is heated by infrared irradiation or radio frequency.

FIG. 10

This shows an alternative embodiment of the vacuum fryer 23 as referred to in FIG. 1. It is a cross-section of an infra-red expanding unit.

The raw product slices 89, 90 enter the fryer 23 at 87. The product enters from the hopper and valve configuration 114 which is off-set from the axis of the vacuum chamber 109 to enable the product to fall through the guiding chute 115 into the vacuum chamber 109. The product falls onto a tumbling interlinked weighted hinge belt 116 which is moving in an anti-clockwise direction 188. The hinges are positioned upwards 120 in the hinge belt 116 with the smooth side 121 in direct contact with the rollers 122. The belt 116 forms a concave recess 123 into which the product is deposited onto the belt 116. The hinges on the hinge belt 116 allow the product to rotate and bring the product slices into contact with the infra-red rays on a continuous basis. The infra-red unit 119 heats and cooks the product as the hinge tumbler 116 rotates the product, and as it rotates the individual product slices receive an even dosage of the infra-red heating 124.

In this configuration the hinge-belt 116 will move in a clockwise direction 189 when a batch is being discharged. A shield 118 will assist the product to fall onto the discharge belt 117.

FIG. 11

Figure 10:
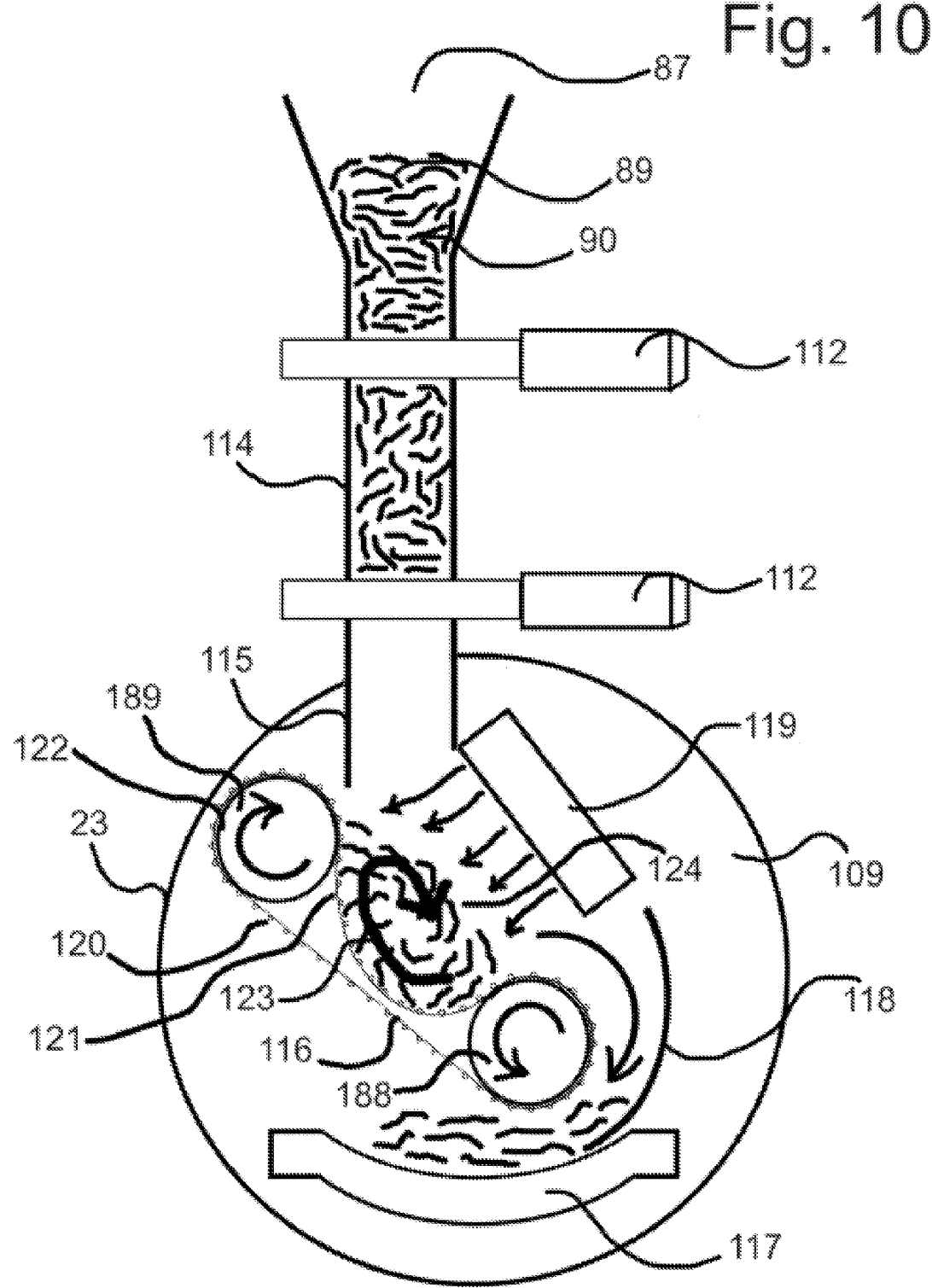
Figure 18:
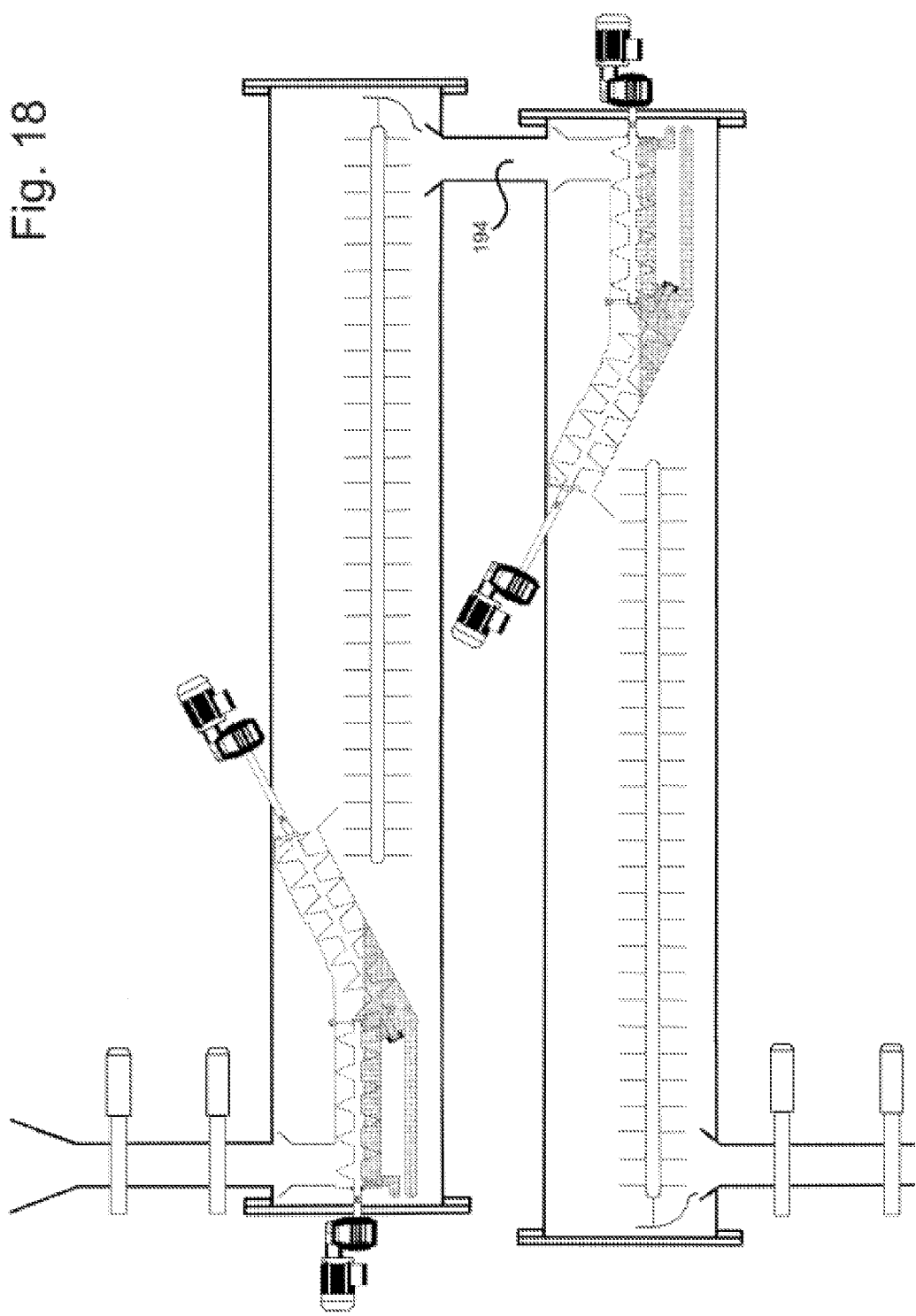
FIG. 18 shows two vacuum fryers used in series, in the apparatus of FIG. 1.

FIG. 11 is a side view of an infra-red embodiment of the invention. This shows the infra-red configuration as a batch system, and the infra-red units 119 are placed side by side in front of the hinge belt and roller configuration 126. The infra-red unit configuration is shown as three units side by side but are not limited to this number. The flow and systems are similar to FIG. 9. The difference in configuration is that of the discharge belt 117, and infra-red unit 119 as described in FIG. 10. The infra-red units in this configuration have flat side barriers 125 stopping product from falling off the edge of the hinge belt and roller configuration 126. There are two roller drives 127, one for clockwise and one for anti-clockwise.

FIG. 12

FIG. 12 is a side view of the vacuum unit of a continuous line for the infra-red 119 configuration. The flow and systems of the unit are of similar nature to that of FIG. 11 however the unit runs as a continuous line instead of a batch system. The vacuum unit is positioned at a downward angle towards the product exit 99. Lowering of the discharge end of where the product exits the unit results in a faster throughput of the product. The continuous infra-red unit 126 has one flat side barrier 125 and one belt drive 127 as it is a continuous unit.

FIG. 13A

FIG. 13 illustrates the valve system of the vacuum fryer, and a drying system for the fried product.

The drive (i.e. motor and gearbox) 160 for the fryer's screw shaft and the drive 161 for the exit screw shaft are also shown. The drying belt also has a drive 192 mounted outside the vacuum chamber.

There is a sealing plate 162 at each end of the vacuum fryer.

This drying system consists of a belt 135 with flights and a trough 166 with holes in the sides of the trough along its length to allow moisture to escape. The holes are slightly higher than the level of the product which is being conveyed along the belt, and therefore the product does not fall out of the holes.

The passage of the product along this belt 135 allows the pliable product to harden and the bubbles created during frying to set, so that the product becomes crisp and crunchy.

The product enters the vacuum fryer 23 at the inlet 89 and exits at the outlet 99. Both the inlet and the outlet have valves 128a, 128b, 129a and 129b which impede the transit of the product.

The valves 128a and 128b are synchronised to open at the same moment whilst the valves 129a and 129b remain closed. The valves 129a and 129b are also synchronised to open at the same moment whilst the valves 128a and 128b remain closed. The opening and closing of these valves allow a batched portion of not-yet-fried product to enter the vacuum fryer as a batched portion of fried product exits.

The fluctuation in pressure within the vacuum chamber is negligible, because the inflow of a small amount of regular air is only momentary when 129a is opened and when 128b is opened.

The remaining numbers in FIG. 13A are provided as a cross-reference to numbers in other figures.

FIG. 13B

The functionality is identical to 13A, but using a rotating valve system for loading and unloading of raw material.

In FIGS. 13A and 13B the valves of the portion of the unit marked 164 and rotating drum 164 are under vacuum and needs to be equalised to ambient pressure prior to exiting 164. This pressure is regulated through a valve system to ensure the correct pressures in 164, and to allow the product to exit the fryer without crushing and smashing because of the sudden vacuum to air pressure release.

To reset the chamber 164/164B the ambient air is replaced with the vacuum from the frying chamber by means of the automated valve.

FIG. 14

FIG. 14 shows two types of conveying belts, one with flights without a heater 135 and one with flights with a heater 136, one conveyor belt without a heater and excluding the flight 137 and a conveyor with a heater 138.

Reference 130 refers to a flat surface of the conveying belt where the product rests on the belt and 131 refers to an upright flight that can vary from 20 mm-250 mm in height. Reference 132 refers to a gap between the flights 131 that can vary between 50 mm-300 mm. The unit 135 does not have a heater in or around it and is used to cool and increase the holding time of the product under vacuum; this is related to the length of the flight conveyor belt.

Conveyor 136 employs a heater 133 in the centre of the unit, in the top run from left to right the heater is below the belt and in the bottom run from right to left the heater is above the belt. This is to ensure that the product does not cool too fast in one direction under vacuum, ensuring that water vapour in the vacuum chamber will not condense back onto the product. At the bottom set of flights, the cooling action will continue but not to its full possible extent.

Belt 137 is a flightless belt without a heater, the product flows out from the fryer continuously on the belt.

Belt 138 is a flightless belt with a heater.

FIG. 15

FIG. 15 is similar to FIG. 13, but shows a different configuration around the drying belt 135. There is no trough. Instead, the product falls from the belt into the exit hopper 164, which in this case is positioned at the end of the chamber. A baffle 193 guides the product as it drops off the end of the belt.

FIG. 16

FIG. 16 is similar to FIG. 13, but in this configuration there is also provided a heat element 133 beneath the belt 136. The heat helps the fried product to dry.

FIG. 17

FIG. 17 is also similar to FIG. 13, but shows two belts 138 supplied with heat elements beneath them. The product falls from the top level belt onto the lower level before exiting the chamber. In this example, the belt has no flights. If the vacuum chamber is big enough, there could be belts on further levels. Some or all of these belts may have heat elements.

The heating could be electrical plate heating or oil heating or other conventional means of heating.

FIG. 18

In some cases it may be advantageous to have more than one fryer 23. One example is in the case of products such as fruit, which have a high sugar content, in which case it is difficult to release the moisture entrapped in such products.

Depending on the type, the fruit entering the vacuum fryer may have been pre-dried by conventional means or blanched.

In this illustration, there is provided a chute 194 between two vacuum fryer chambers. If desired, a batching of product pieces may be facilitated between the two chambers by a screw feed or a valve gate system (not shown) within the chute.

The double fryer system is used to process high sugar products e.g. an air dried watermelon which have a high osmotic pressure. The double frying system removes the moisture whilst expanding the product without caramelization. In the first fryer, the product is fied, for example, for 6 seconds, then cooled and thereafter refried in the second fryer for another 6 seconds, then cooled and discharged.

FIG. 19A

In the preferred embodiment of the invention illustrated in FIG. 19A, the product is moved through hot oil by means of a screw feed 149, and is removed from the oil by a second screw feed 150. In alternative embodiments of the invention, the product may be immersed and removed by other means, such as by means of a basket, a belt, or a series of perforated buckets.

As it is moved upwards by this screw feed 150, the product is still partially pliable and not fully crisp. It is therefore not damaged by the rotation of the screw.

The product enters the fryer after exiting the last gate valve 129a (as shown in FIG. 13A). The pre-dried product 139 passes through a chute 182 and enters a fryer 173. The chute 182 is not attached to the wall of the vacuum chamber (186 as shown in FIG. 19B). In a typical implementation of the invention, the specified temperature for the pre-heated oil in the fryer 173 could be in a range of 140° C. to 195° C., and the preferred temperature could be 150° C. as it enters the fryer at an oil entry point 174.

The housing 154 of the fryer is preferably composed of two cylindrical stainless steel pipes which intersect at an angle as shown. A longitudinal aperture 176 extending from the top of the first pipe to the second pipe, allows moisture and steam to escape from the product into the vacuum chamber surrounding the fryer. In the illustrated embodiment of the invention, the pipe does not have an opening beyond the point 177. However, in a different embodiment, there could be one or more openings.

The oil passes from a pipe 142 into the frying chamber (within the vacuum chamber) via an inlet 174, the supply being controlled by a regulator (shown as 178 in FIG. 19B). The flow is regulated by an oil flow regulator at the outlet 175. This regulates the minimum and maximum depth of the oil within the frying chamber, as well as the speed at which the oil passes through the chamber. By increasing or decreasing the speed of the oil flow so that the oil flows either slower, faster or at the same speed as the product is being conveyed, the temperature of the oil and the turbulence can be controlled to optimise and standardise the product quality. The oil moves from the inlet 174 to the outlet 143 through the full length of the chamber.

In this embodiment of the invention, no heating mechanism is required within the fryer, as the oil is heated by means of an external heat exchanger 183 (not shown in FIG. 19). Upon leaving the fryer, the oil flows back to the heat exchanger. There is provided a mesh filter 144 before leaving the fryer at the outlet 143. The filter ensures that larger particles are removed from the exiting oil.

The inflow and outflow pipes can be detached at 142 and 143, allowing removal of the fryer from the vacuum chamber for cleaning and maintenance.

The final product produced by this embodiment of the invention may have an oil content of 15 to 25%, but this would depend on the moisture content of the product upon entry into the fryer and other criteria.

The screw may have one or more flights. (This diagram shows one flight 159.) The flight 159 is perforated throughout its entire length. The holes in the flight 159 typically range from 2-8 mm in diameter to allow oil to pass through as the screw rotates. The holes are small and smooth enough to not damage or catch the product being fried. The screw feed 149 rotates, moving the product forward and contributing to a light mixing action beneath the surface of the oil flow.

The flight 159 of the exiting screw feed 150 has similar holes.

The screw shaft 149 is supported at one end by a metal cap 184 suspended from a bracket 147. The other end of the shaft is held in place by fitting into a rotary lip seal 140 in a closure plate 185 at the end of the fryer 173. The lip seal prevents oil from leaking out of the fryer. The machine which drives the screw shaft has a shaft of its own which extends all the way through the sealing plate and clicks into the end of the screw shaft 141 when the sealing plate is closed.

The rotary lip seal should preferably be made of Teflon. The seal 140 and cap 184 remain stationary while the shaft rotates.

The sealing plate is indicated in FIGS. 13A and 13B as reference number 162.

The shaft of the exiting screw feed 150 has similar (but not identical) support fittings, with 145 being similar to 184 (but not removable), and 189 being similar to 141 as it fits into its drive shaft 155. There is also a removable supporting ring 153 suspended from a bracket to hold the shaft in place.

In this embodiment of the invention, the oil level is only up to the level of the screw shaft 146. Together, the oil level, feed mechanism and oil regulation system contribute to ensuring that minimal oil is recycled and that fresh oil is introduced continuously without requiring the discarding of oil. All the oil is thus fully utilised in this process. The oil is not subjected to great fluctuations in temperature, which would result in an inefficient use of energy and would have other disadvantages relating to product quality.

One advantage of the exiting screw feed 150 is that the flight which takes the product out of the oil is not subject to continuous cooling and heating as in the case of a belt or bucket removal system. One of the problems with cooling and heating is an inefficient use of energy and space. The top of the exiting screw feed 150 remains out of the oil at all times, and is therefore cool, allowing the product to cool. If the removal mechanism is hot at this stage, it would continue imparting heat to the product. This could result in adverse effects such burning, caramelization and increased acrylamide formation.

Provision is made for a scraper mechanism 148 made of any material deemed suitable. This material may be stainless steel. The scraper removes any unwanted particles or residue which may accumulate at the end of the horizontal shaft 149 before the product is taken upwards by the exiting screw feed 150.

FIG. 19B

FIG. 19B shows a detail end view of the fryer 173 in FIG. 19A. In addition, it shows a supporting frame 179 which is welded onto the outside of the fryer. The supporting frame 179 assists in ensuring that the frying chamber does not distort when heated. The frame can also have wheels 180 on a rail 181 mounted onto the inner walls of the vacuum chamber 186. The wheels and rail facilitate ease of removal of the fryer from the vacuum chamber for cleaning and maintenance.

Further support and rigidity is provided by the oil inlet pipes 142 and 143 which run through the wall of the vacuum chamber and are welded onto it.

FIG. 19C

FIG. 19C illustrates apparatus used in maintaining oil temperature in the oil frying zone of the Fryer 173 shown in FIG. 19A. In this fryer, the product can take up to 25 seconds to fry (see cool zone B) and the oil can cool during the 25 second period, and when the temperature of the oil drops too low, hot oil is added to maintain the heat up to the end of the frying process. To maintain the oil temperature, hot oil is added via openings into the fryer from one or two pipes that are mounted above the cool zone B near the end of the oil frying area through a pipe system as shown in the drawing. To control oil flow valves C1 and C2 will allow the required oil pressure to be maintained while passing through the pipes.

Oil Flow Restrictor Sleeve D:

To control the oil flow into the required area, sleeve D is used. This sleeve has a tight fit around the pipe and can be rotated and can be placed over an opening E or a portion of the opening as a restrictor or as a closing device thereby controlling the oil flow into the required area.

FIG. 20

Figure 22:
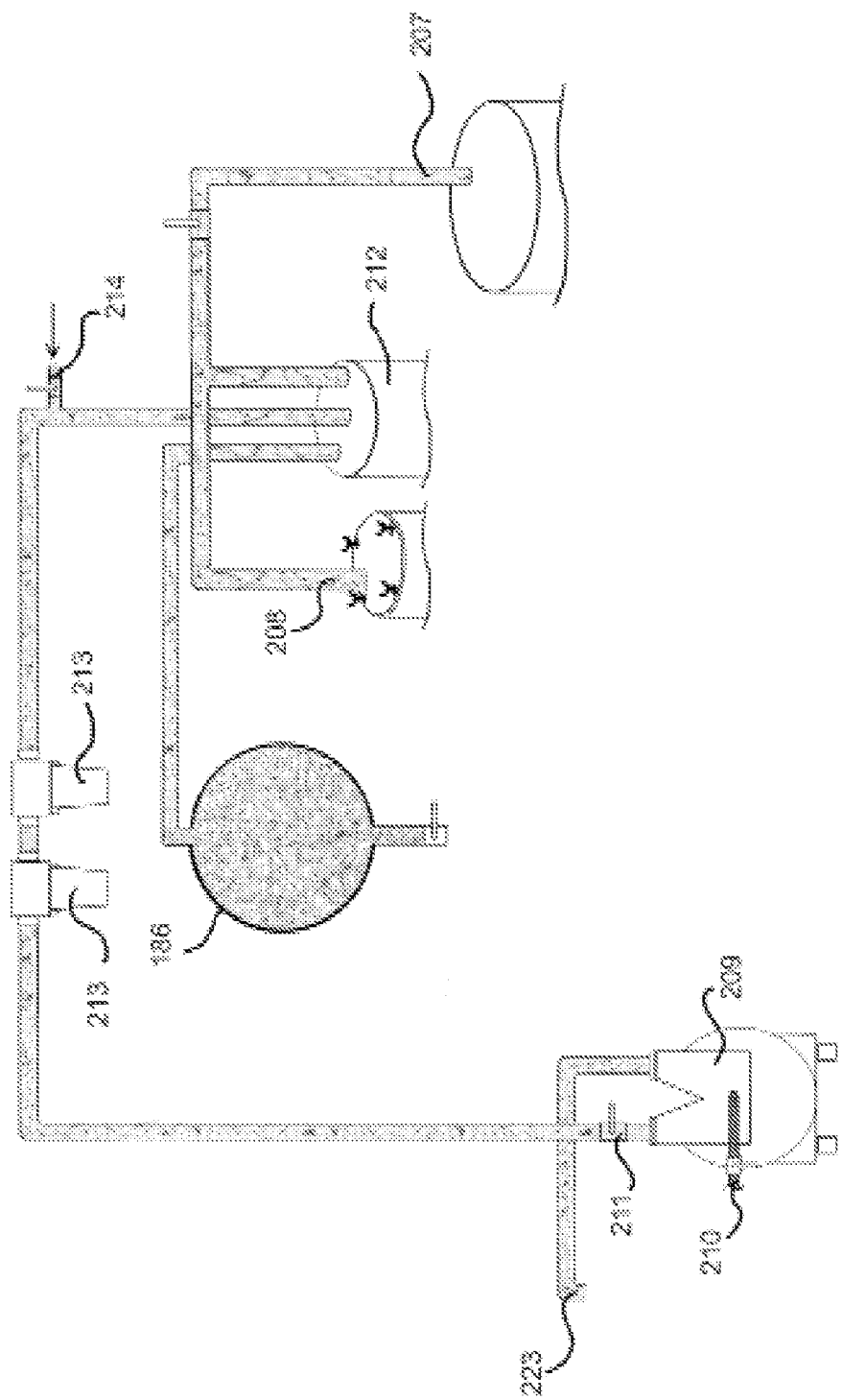
Figure 23:
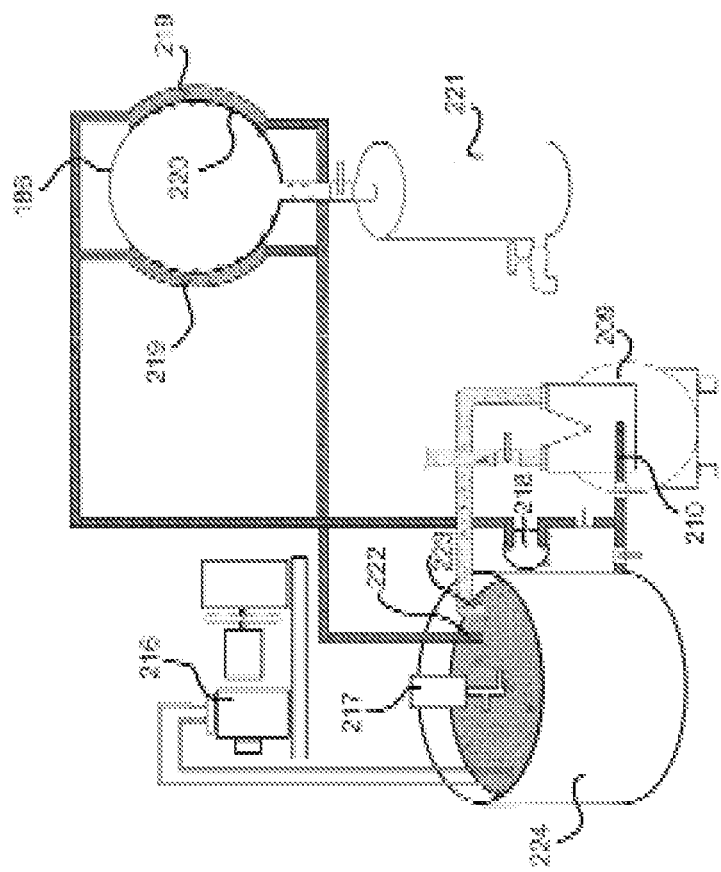

This figure shows the vacuum fryer and supporting systems (described in detail areas in FIGS. 21, 22 and 23).

FIG. 21

FIG. 21 shows the oil supply and heating system for the vacuum fryer (with the other components shown in FIG. 20 removed from this illustration for the sake of clarity). The system has been designed to be energy-efficient in that the oil used for frying is itself used in other parts of the heating system to impart and preserve heat.

Fresh oil enters the system at ambient temperature at 195. There is provided a manually operated valve 196 to close off the supply for cleaning and maintenance.

The oil passes into a jacket chamber 197 which partially or completely surrounds the oil reservoir tank 198. Alternatively, instead of a jacket chamber, there could be a heat exchanger pipe which extends around the tank, or is enclosed by it, or is immersed in the tank. The oil is pre-heated within this chamber by the heat of the oil in the oil reservoir tank 198.

There is provided a valve (not shown) between the jacket chamber 197 and the reservoir tank itself, so that when the level of oil in the reservoir tank 198 drops below a certain level, the valve opens and draws in more oil from the jacket chamber. This drawing in of fresh oil is the result of a vacuum which is drawn throughout the oil supply system. Thus the oil is mostly pulled rather than pumped through the system.

An oil pump 199 pulls oil to be used for frying from the reservoir tank 198 to a conventional plate heat exchanger 183. The oil is preferably heated to a temperature of 150 degrees C. and maintained at this temperature at all stages of its passage through the system. The heat exchanger 183 has an inlet 200 and an outlet 201 for oil that acts as a heating medium and this oil is of a different type from the oil used for frying.

When the system is started up, the valve 202 is closed and the valve 201 is opened. Thus the oil circulates from the reservoir tank 198 to the heat exchanger 183 down through the open valve 203 until a constant desired temperature has been established.

Once this temperature has been reached and maintained, the valve 201 is closed and the valve 202 is opened allowing oil to be drawn into the oil fryer 173. (The outer vacuum chamber is not shown in this illustration.)

The oil supply to the fryer 173 is controlled by means of a level switch flow regulator 178.

The exiting oil is drawn by a pump 204 to an oil filter 206a.

There is provided a siphon restrictor 205 to ensure optimal flow. From the filter 206a, the oil is reintroduced into the reservoir tank 198.

After the pump 199 a fine filter 206b is used to remove particles prior to the oil entering the heat exchanger 183.

There are also provided vacuum extraction points at 207 and 208 to remove air from the system.

FIG. 22

FIG. 22 shows the vacuum system for the vacuum fryer (with the other components shown in FIG. 20 removed from this illustration for the sake of clarity).

The vacuum pump 209 is preferably a liquid ring vacuum pump. There is a water supply 210 to the vacuum pump to cool the pump. The control valve 211 is a hand-controlled valve or a non-return valve. In an emergency (such as a power failure), this valve ensures that water is not sucked through into the fryer.

The vacuum pump removes air from the vacuum chamber 186 and simultaneously also from the oil filter 208 and the oil reservoir tank 208. The water, water vapour and air are discharged at 215.

A safety tank 212 ensures that any water or oil which should not be in the system can be captured and released via a tap. (This is shown in greater detail in FIG. 20.)

Condensers 213 remove oil and water vapour if necessary.

Water released by the vacuum pump is returned to the water supply via a pipe 223.

To stop the system, it is necessary to close the valve 211 and then to open the fresh air valve 214.

FIG. 23

FIG. 23 shows the water cooling system for the vacuum fryer (with the other components shown in FIG. 20 removed from this illustration for the sake of clarity).

A compressor 216 is connected to a cooling element which is immersed in the water in a supply tank 224. A motorised paddle mixer 217 helps to circulate the water.

The cooled water is drawn into the vacuum pump at 210.

A water pump 218 draws water into a jacket chamber 219 which surrounds the vacuum chamber 186.

Water which condenses on the inside wall of the vacuum chamber 220 runs down and is collected in a holding tank 221 below.

The water which is pumped to the jacket chamber returns into the tank via a pipe 222. Water from the vacuum pump is also returned to this water supply tank 224.

FIG. 24

The vegetable or fruit pieces could be sliced into various types of slices prior to processing. Examples are illustrated here. A raw fruit or vegetable slice is typically in the range of 0.8 mm to 12 mm thickness. The thickness should be standardised to ensure consistent product quality.

FIG. 25

The present invention is aimed at producing products with characteristics such as these illustrated here.

225 shows a cross-section of the shape of a neat raw vegetable or fruit slice prior to processing.

226a and 226b are slices of fruit or vegetable after blanching and drying (also shown in cross-section). The dark area indicates that the inside has more moisture than the outside.

227a shows how the slice 226a is expanded when fried. 228a shows the size of the bubbles. Similarly, 227b shows how the slice 226b is expanded when fried. 228b shows that the slice has particularly large bubbles.

Large bubbles contribute to the lightness and crispness of a snack food product.

FIG. 26

Figure 25:
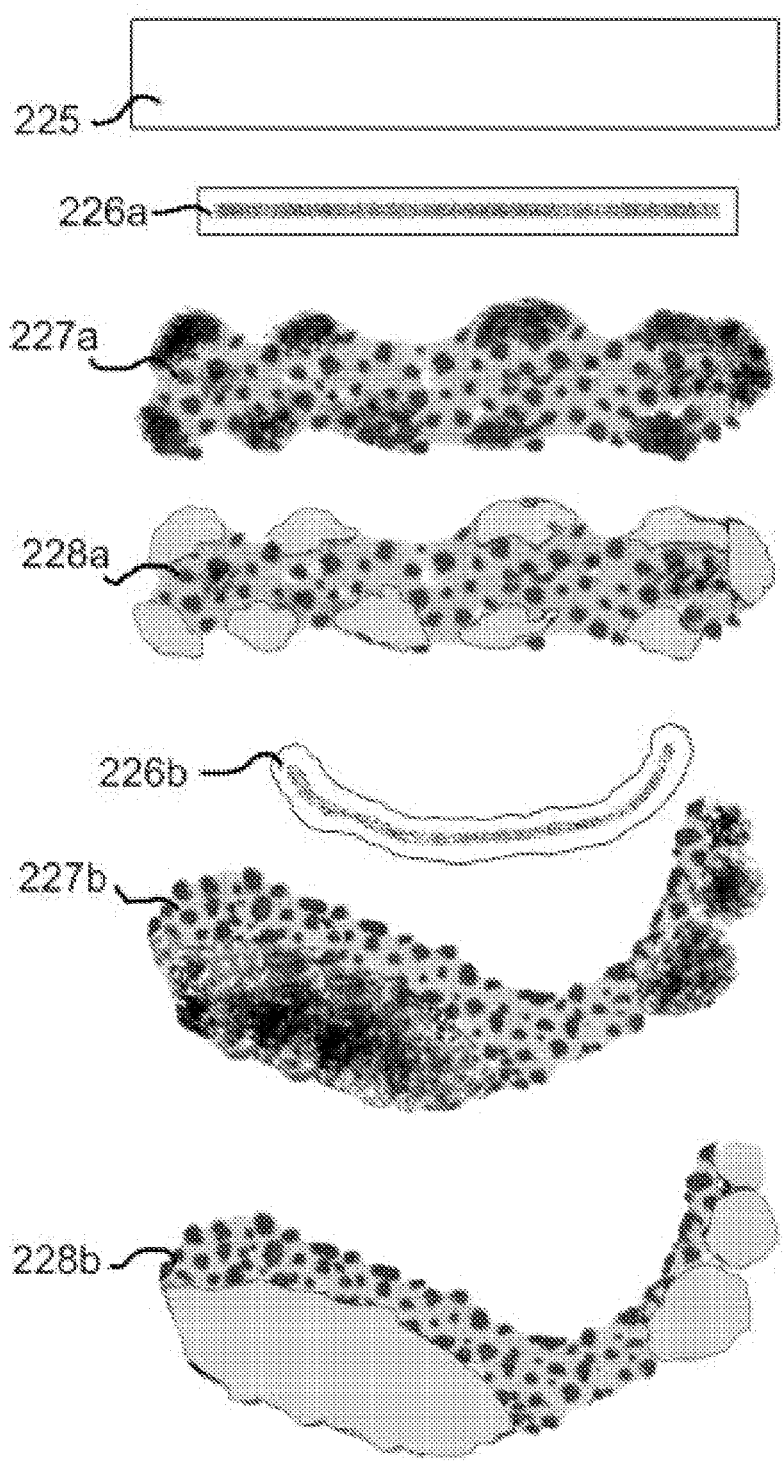

The progression shown in FIG. 25 is similarly illustrated here.

226c indicates the even distribution of moisture after the blanched, dried product has been stored for some time. When this product is fried, the result 227c is more even. The consistent size of the bubbles is shown in 228c.

Adding External Moisture Prior to Frying:

To stop sensitive products from caramelising or burning in the fryer, the pre-dried product can be passed through a fine mist spray or steam tunnel, to add moisture to the surface of the product slices prior to frying. As an example, steam can be employed on the lift 21 as shown in FIG. 3 or the lift can be replaced by a screw feed conveyer that mixes and adds moisture to the slices before entering the fryer. A preferred alternative is a separate continuous steam or water vapour tumble mixer. The product exiting the tumble mixer will fall into the hopper of 21.

Controlled Moisturising of the Slices Prior to Frying:

When product leaves the blancher-dryer 17, and/or has been stored for a longer period with low moisture content in the region of 8% to 15%, the slices could be too dry to expand correctly in the fryer. Internal moisture needs to be raised from between 15% to 25%. This is done by using an automated mixer which is a continuous steam or water vapour tumble mixer or a moisturising vibrating fluidised bed (21c as shown in FIG. 3) which accurately doses the specified amounts of moisture to the product. Products that are dense can be stored to allow the moisture to equalise through the slices, prior to frying.

FIG. 27

Various examples of fruit slices are shown in cross section. Textural additions can be provided prior to drying and then remain adhered to the product during the rest of the process. Instead of plain fruit slices 229, there may be fruit slices which have a layer of phyllo pastry on one side (230), with phyllo pastry on both sides (231), fruit slices crumbed on one side (232) or crumbed on both sides (233). Starch powder or other textural additions may also be used.

Referring to all of FIGS. 1 to 27

The present invention can be used to make crisp snack food products from various ingredients, including vegetables, fruits, or gelatinizable proteins from fish. This does not exclude formulated products with a multitude of ingredients which are mixed to produce one product which is then pre-gelatinized. Therefore, the invention allows production of a low fat flavoured soup which is thickened with starches, then dried on a flatbed producing a sheet and cut into portions, which can be expanded to produce a crispy crunchy snack using this system.

The main challenge is to expand a product without caramelizing it into a deep brown colour or burn it in the process. To achieve this, moisture content of the product needs to be controlled before it enters the fryer, the moisture on the outer surface of the product needs to be controlled before entering the fryer, and moisture needs to be removed from the product whilst it is in the fryer, to produce a crispy, natural coloured crisp without caramelizing or burning.

The ingredients mentioned in the Brix testing results—tables B, C and D (below) are all suitable for use in the present invention. These types of ingredients have many fluctuations in sugar content individually and their cultivars. The season produces fresh young product, in between the normal product and the aged product and some product that goes into sprouting. The sugars change dramatically during the season and are very complicated to control. But even with these variations in the products, they can be used in the present invention and this cannot be achieved using the conventional potato crisp fryer, without burning.

To understand each and every ingredient adequately for processing in the conventional potato crisp fryer, the food scientist and technologist would need in-depth research, costly testing and they will succeed with individual raw material, but utilizing the combination of any of the raw material would be a major cost and challenge—if it is achievable at all. To do so, (1) the total dry solids content (moisture content) of the individual raw material needs to be known, to understand the yield content and (2) the Brix content for the processing parameters as this involves the sugar content for the adjustments that are needed in the processing parameters. It is complicated for the food scientist and technologist to understand and process fruit and vegetables into a crispy, crunchy crisp and some of the basic criteria or technologies needed are: cultivars, season, storage period (when is it being used/what condition is it in), humidity, temperature, proteins, lipids, minerals, pH, sugar, moisture content, structure of starch granule polysaccharide components, effects of heating on cell-wall polysaccharides, sugar activation and regulation of synthesis.

Sweetness is normally measured in terms of total soluble solids (TSS) content in Brix. In most fruits and vegetables, sugar makes up the main component of TSS which is thus a reasonable indicator of percentage sugar levels. TSS is measured using a refractometer or a hydrometer and refractometers are easy to use, even for inexperienced operators.

Within a given species of plant, the crop with a higher refractive index will have a higher sugar content, higher mineral content, higher protein content and a greater specific gravity or density. This adds up to a sweeter tasting, more mineral nutritious food (maximum nutritional value) with a lower nitrate and water content and better storage characteristics.

In conventional chip/crisp frying, potatoes with a sugar content that exceeds 0.2% is regarded as not being suitable for frying, but the present invention allows foods (including potatoes) with much higher sugar contents to be used to prepared crisp food products.

Tables of Suitable Raw Food Products for Use in the Present Invention, with % Sucrose or Degrees Brix Provided, where Available The ratings (POOR, AVERAGE, GOOD and EXCELLENT) mentioned in the tables below relate to the shelf life of raw foods that can be used to manufacture snack food products according to the present invention. The ratings do not refer to the processing capability of the raw foods—the present invention can be used to process foods despite any of these fluctuations.

TABLE A

| Vegetables | | | | |
| --- | --- | --- | --- | --- |
|  | POOR | AVERAGE | GOOD | EXCELLENT |
| Beets | 6 | 8 | 10 | 12 |
| Beetroot |  |  |  |  |
| Bell Peppers | 4 | 6 | 8 | 12 |
| Butternut squash |  |  |  |  |
| Broccoli | 6 | 8 | 10 | 12 |
| Carrots | 4 | 6 | 12 | 18 |
| Cauliflower | 4 | 6 | 8 | 10 |
| Celery root |  |  |  |  |
| Green Beans | 4 | 6 | 8 | 10 |
| Hot Peppers | 4 | 6 | 8 | 10 |
| Kohlrabi | 6 | 8 | 10 | 12 |
| Mirliton |  |  |  |  |
| Mangel beets |  |  |  |  |
| Onions | 4 | 6 | 8 | 10 |
| Parsnip |  |  |  |  |
| Potatoes, Irish | 3 | 5 | 7 | 8 |
| Potatoes, Red | 3 | 5 | 7 | 8 |
| Potatoes, Sweet | 6 | 8 | 10 | 14 |

TABLE A-continued

Vegetables

|  | POOR | AVERAGE | GOOD | EXCELLENT |
|---|---|---|---|---|
| Romaine | 4 | 6 | 8 | 10 |
| Rutabagas | 4 | 6 | 10 | 12 |
| Squash | 6 | 8 | 12 | 14 |
| Sugar beet |  |  |  |  |
| Turnips | 4 | 6 | 8 | 10 |

TABLE B

Protein/Crackling

|  | POOR | AVERAGE | GOOD | EXCELLENT |
|---|---|---|---|---|
| Fish skin |  |  |  |  |
| Fish tongue |  |  |  |  |
| Fish Kokotxas |  |  |  |  |
| Tendon or Sinew |  |  |  |  |

TABLE C

Fruit

| FRUIT | POOR | AVERAGE | GOOD | EXCELLENT | ACID |
|---|---|---|---|---|---|
| Apple (Sour) | 6 | 10 | 14 | 18+ | Malic |
| Apple (Sweet) | 10 | 14 | 18 | 22+ | Malic |
| Apricot | 6 | 12 | 16 | 23+ | Malic |
| Banana | 8 | 10 | 12 | 14+ | Malic/Citric |
| Cantaloupe | 8 | 12 | 14 | 16+ | — |
| Casaba Melon | 8 | 10 | 12 | 14+ | — |
| Fig | 1.06 | 4 | 10-Jun | 15 | Malic |
| Guava | 1.026-1.047 | 11-Jul | 14-20 | — | — |
| Honeydew | 8 | 10 | 12 | 14+ | — |
| Kiwi | 8 | 12 | 14 | 18+ | Citric |
| Kumquat | 4 | 6 | 8 | 10+ | Citric |
| Mango | 4 | 6 | 10 | 14+ | — |
| Nectarine | 6 | 12 | 16 | 20+ | Malic |
| Papaya | 6 | 10 | 18 | 22+ | — |
| Peach | 6 | 12 | 16 | 20+ | Malic |
| Pear | 6 | 12 | 16 | 20+ | Malic |
| Persimmon | 1.056 | 04-Feb | 14 | — | — |
| Pineapple | 12 | 14 | 20 | 24+ | — |
| Plantain |  |  |  |  |  |
| Plum | 6 | 12 | 16 | 20+ | Malic |
| Squash | 6 | 8 | 12 | 16+ | — |
| Strawberry | 6 | 10 | 14 | 16+ | Citric |
| Tomato (Slicing) | 4 | 6 | 8 | 12+ | — |
| Tomato (Cherry) | 10 | 14 | 16 | 22+ | — |
| Watermelon | 8 | 12 | 14 | 16+ | — |

The invention claimed is:

1. A method of preparation of a crisp food product, said method including the steps of:

blanching slices of food in a confined space between two sheets that are generally impervious to moisture, while exposing the slices of food to heat and substantially retaining the moisture of the slices of food within said space between the sheets, and while supporting the slices of food on a perforated sheet, said moisture impervious sheets and said perforated sheet each being endless and said slices of food being conveyed continuously on the perforated sheet while being blanched;

transferring the slices of food from the perforated sheet by applying an air stream to the slices of food, said air stream being applied from a side of the perforated sheet that is opposite from the slices of food and said air stream passing through the perforated sheet, to the slices of food;

dehydrating the slices of food in air;

exposing the slices of food to heat, under vacuum;

removing the slices of food from sources of heat, while still under vacuum; and cooling the slices of food, while still under vacuum.

2. The method according to claim 1, further comprising humidifying the surfaces of the slices of food before exposing the slices of food to heat under vacuum.

3. The method according to claim 1, wherein exposing the slices of food to heat by includes submersing the slices of food in hot oil with a temperature of 140° C. to 195° C. for 25 seconds or less.

4. The method according to claim 3, further comprising quickly removing the slices of food from any object that is hotter than the slices of food, once the slices of food are removed from the hot oil, while still keeping the slices of food under vacuum.

5. The method according to claim 4, wherein the slices of food are fed horizontally along the hot oil by progress of the flights of a rotating feed screw that is partly submerged in the oil, and are removed from the hot oil by being driven along an inclined travel path by progress of the flights of at least one rotating helical screw.

6. The method according to claim 3, which includes feeding the slices of food horizontally along the hot oil by progress of the flights of a rotating feed screw that is partly submerged in the oil, and removing the slices of food from the hot oil by being driven along an inclined travel path by progress of the flights of at least one rotating helical screw.

7. The method according to claim 1, wherein the thin food pieces are exposed to heat from microwave irradiation.

8. The method according to claim 1, wherein the thin food pieces are exposed to heat from infrared irradiation.

9. The method according to claim 1, further comprising storing the slices of food for an extended period of 24 hours to 9 months, after the step of dehydrating the slices of food and before the step of exposing the slices of food to heat, under vacuum.

10. The method according to claim 1, wherein the slices of food used in the method have a sugar content exceeding 0.2%.

11. A method of preparation of a crisp food product, said method including the steps of:

blanching slices of food in a confined space between two sheets that are generally impervious to moisture, while exposing the slices of food to heat and substantially retaining the moisture of the slices of food within said space between the sheets, and while supporting the slices of food on a perforated sheet, said moisture impervious sheets and said perforated sheet each being endless and said slices of food being conveyed continuously on the perforated sheet while being blanched;

dehydrating the slices of food in air;

exposing the slices of food to heat in hot oil, under vacuum;

feeding the slices of food horizontally along the hot oil by progress of the flights of a rotating feed screw that is partly submerged in the oil, removing the slices of food from the hot oil by being driven along an inclined travel path by progress of the flights of at least one rotating helical screw, while still under vacuum; and cooling the slices of food, while still under vacuum.

12. The method according to claim 11, which includes transferring the slices of food from the perforated sheet by applying an air stream to the slices of food, said air stream being applied from a side of the perforated sheet that is opposite from the slices of food and said air stream passing through the perforated sheet, to the slices of food.

13. The method according to claim 11, further comprising humidifying the surfaces of the slices of food before exposing the pieces of food to heat in the hot oil, under vacuum.

14. The method according to claim 11, wherein exposing the slices of food to heat includes submersing the slices of food in the hot oil at a temperature of 140° C. to 195° C. C for 25 seconds or less.

15. The method according to claim 11, further comprising storing the slices of food for an extended period of 24 hours to 9 months, after the step of dehydrating the slices of food and before the step of exposing the slices of food to heat in the hot oil, under vacuum.

16. The method according to claim 11, wherein the slices of food used in the method have a sugar content exceeding 0.2%.

17. A method of preparation of a crisp food product, said method including the steps of:
blanching slices of food in a confined space between two sheets that are generally impervious to moisture, while exposing the slices of food to heat and substantially retaining the moisture of the slices of food within said space between the sheets, and while supporting the slices of food on a perforated sheet, said moisture impervious sheets and said perforated sheet each being endless and said slices of food being conveyed continuously on the perforated sheet while being blanched;
dehydrating the slices of food in air;
storing the slices of food for an extended period of 24 hours to 9 months;
exposing the slices of food to heat, under vacuum;
removing the slices of food from sources of heat, while still under vacuum; and
cooling the slices of food, while still under vacuum.

18. The method according to claim 17, which includes transferring the slices of food from the perforated sheet by applying an air stream to the slices of food, said air stream being applied from a side of the perforated sheet that is opposite from the slices of food and said air stream passing through the perforated sheet, to the slices of food.

19. The method according to claim 17, further comprising humidifying the surfaces of the slices of food before exposing the pieces of food to heat under vacuum.

20. The method according to claim 17, wherein exposing the slices of food to heat includes submersing the slices of food in hot oil with a temperature of 140° C. to 195° C. C for 25 seconds or less.

21. The method according to claim 20, which includes feeding the slices of food horizontally along the hot oil by progress of the flights of a rotating feed screw that is partly submerged in the oil, and removing the slices of food from the hot oil by being driven along an inclined travel path by progress of the flights of at least one rotating helical screw.

22. The method according to claim 17, wherein the slices of food used in the method have a sugar content exceeding 0.2%.

23. A method of preparation of a crisp food product, said method including the steps of:
blanching slices of food in a confined space between two sheets that are generally impervious to moisture, while exposing the slices of food to heat and substantially retaining the moisture of the slices of food within said space between the sheets, and while supporting the slices of food on a perforated sheet, said moisture impervious sheets and said perforated sheet each being endless and said slices of food being conveyed continuously on the perforated sheet while being blanched;
dehydrating the slices of food in air;
exposing the slices of food to heat by submersing the slices of food in hot oil with a temperature of 140° C. to 195° C. C for 25 seconds or less, under vacuum;
removing the slices of food from sources of heat, while still under vacuum; and
cooling the slices of food, while still under vacuum.

24. The method according to claim 23, which includes transferring the slices of food from the perforated sheet by applying an air stream to the slices of food, said air stream being applied from a side of the perforated sheet that is opposite from the slices of food and said air stream passing through the perforated sheet, to the slices of food.

25. The method according to claim 23, further comprising humidifying the surfaces of the slices of food before exposing the pieces of food to heat in the hot oil, under vacuum.

26. The method according to claim 23, which includes feeding the slices of food horizontally along the hot oil by progress of the flights of a rotating feed screw that is partly submerged in the oil, and removing the slices of food from the hot oil by being driven along an inclined travel path by progress of the flights of at least one rotating helical screw.

27. The method according to claim 23, further comprising storing the slices of food for an extended period of 24 hours to 9 months, after the step of dehydrating the slices of food and before the step of exposing the slices of food to heat in the hot oil, under vacuum.

28. The method according to claim 23, wherein the slices of food used in the method have a sugar content exceeding 0.2%.

* * * * *